US009839055B2

(12) United States Patent
Cartmell

(10) Patent No.: US 9,839,055 B2
(45) Date of Patent: Dec. 5, 2017

(54) METHOD AND GATEWAY TO HANDLE INACTIVITY TIMER EXPIRY WITH A CONVERGED GATEWAY

(71) Applicant: InterDigital Patent Holdings, Inc., Wilmington, DE (US)

(72) Inventor: John Cartmell, North Massapequa, NY (US)

(73) Assignee: InterDigital Patent Holdings, Inc., Wilmington, DE (US)

(*) Notice: Subject to any disclaimer, the term of this patent is extended or adjusted under 35 U.S.C. 154(b) by 57 days.

(21) Appl. No.: 14/648,499

(22) PCT Filed: Nov. 27, 2013

(86) PCT No.: PCT/US2013/072290
§ 371 (c)(1),
(2) Date: May 29, 2015

(87) PCT Pub. No.: WO2014/085622
PCT Pub. Date: Jun. 5, 2014

(65) Prior Publication Data
US 2015/0312950 A1 Oct. 29, 2015

Related U.S. Application Data

(60) Provisional application No. 61/732,104, filed on Nov. 30, 2012.

(51) Int. Cl.
H04W 88/16 (2009.01)
H04W 76/02 (2009.01)
(Continued)

(52) U.S. Cl.
CPC ......... *H04W 76/021* (2013.01); *H04W 76/00* (2013.01); *H04W 76/028* (2013.01);
(Continued)

(58) Field of Classification Search
None
See application file for complete search history.

(56) References Cited

U.S. PATENT DOCUMENTS

2009/0239526 A1* 9/2009 Zhao ............... H04W 60/06
 455/424
2010/0210288 A1* 8/2010 Kim ............... H04W 68/02
 455/458

(Continued)

FOREIGN PATENT DOCUMENTS

SE WO 2010059100 A1 * 5/2010 ........ H04W 36/0005
WO WO 2011/085073 A1 7/2011

OTHER PUBLICATIONS

Perras et al., "Mobility for Heterogeneous SmallNets", XVth International Telecommunications Network Strategy and Planning Symposium (NETWORKS), Oct. 15-18, 2012, 6 pages.

*Primary Examiner* — Robert C Scheibel
*Assistant Examiner* — Ayanah George
(74) *Attorney, Agent, or Firm* — Condo Roccia Koptiw LLP

(57) ABSTRACT

Systems, methods, and instrumentalities are disclosed for handling the expiration of an inactivity timer. A cellular communications system may include a gateway (GW), for example, a converged gateway (CGW) or a local gateway (LGW). The GW may intercept a first message from the eNB intended for a mobility management entity (MME). The first message may include an indication to initiate removal of a first bearer and a second bearer. The first bearer may include an S1 bearer associated with the eNB and the GW and/or include a Radio Bearer associated with the eNB and a wireless transmit/receive unit (WTRLI). The second bearer may include an S I bearer associated with the GW and a serving gateway (SGW). The GW may determine to maintain the second bearer to maintain a communication path (Continued)

associated with the GW and a WTRU and/or send a second message to the eNB to remove the first bearer.

20 Claims, 28 Drawing Sheets

(51) Int. Cl.
    *H04W 76/06*     (2009.01)
    *H04W 76/00*     (2009.01)
    *H04W 76/04*     (2009.01)

(52) U.S. Cl.
    CPC ....... *H04W 76/041* (2013.01); *H04W 76/045* (2013.01); *H04W 76/06* (2013.01); *H04W 76/068* (2013.01); *H04W 88/16* (2013.01)

(56) References Cited

U.S. PATENT DOCUMENTS

| | | | |
|---|---|---|---|
| 2011/0182244 A1* | 7/2011 | Liang | H04W 8/082 370/328 |
| 2011/0228750 A1 | 9/2011 | Tomici et al. | |
| 2013/0070731 A1* | 3/2013 | Lim | H04W 36/00 370/331 |
| 2013/0088956 A1* | 4/2013 | Zhou | H04W 4/08 370/230 |

\* cited by examiner

METHOD AND GATEWAY TO HANDLE INACTIVITY TIMER EXPIRY WITH A CONVERGED GATEWAY

CROSS-REFERENCE TO RELATED APPLICATIONS

This application claims the benefit of U.S. Provisional Patent Application No. 61/732,104, filed Nov. 30, 2012, the contents of which are hereby incorporated by reference herein.

BACKGROUND

In a cellular communications system (e.g., a Long Term Evolution (LTE) cellular communications system), an Evolved Node B (eNB) may maintain an inactivity timer for each User Equipment (UE) associated with the eNB. If a UE does not transmit or receive data before the inactivity timer expires, the eNB may attempt to tear down a bearer that extends between the UE and a Serving Gateway (SGW) associated with the eNB (e.g., a bearer that extends from the UE to the eNB and from the eNB to the SGW).

SUMMARY

Systems, methods, and instrumentalities are disclosed for handling the expiration of an inactivity timer. A cellular communications system may include a gateway (GW), for example, a converged gateway (CGW) or a local gateway (LGW). The gateway may be a standalone device. An Evolved Node B (eNB) may include the gateway (e.g., the gateway may be integrated with the eNB). The GW may intercept a first message from the eNB. The first message may be intended for a core network entity, for example, a mobility management entity (MME). The first message may include an indication to initiate removal of a first bearer and a second bearer. The first message may be received in response to an expiration of an inactivity timer for the WTRU. The first message may be received via the first bearer. The first message may include a WTRU Context Release Request. The first message may indicate the removal of an Evolved Universal Terrestrial Radio Access Network (EUTRAN) Radio access bearer (E-RAB).

The first bearer and/or the second bearer may be an S1 bearer. The first bearer may include an S1 bearer associated with the eNB and the GW. The first bearer may include a Radio Bearer associated with the eNB and a wireless transmit/receive unit (WTRU) (e.g., a WTRU for which an inactivity timer has expired). The second bearer may include an S1 bearer associated with the GW and a serving gateway (SGW).

The GW may determine to maintain the second bearer, for example, to maintain a communication path associated with the GW and a WTRU. For example, the GW may withhold the indication from the MME. The GW may not send the first message and/or the indication to the MME, e.g., the MME may be unaware that the eNB has requested that the second bearer be removed.

The GW may send a second message to the eNB to remove the first bearer. The second message may include a WTRU Context Release Command. The GW may receive a response from the eNB confirming the removal of the first bearer. The response may include a WTRU Context Release Complete message.

The GW may receive data from a serving gateway (SGW) via the second bearer. The GW may send the data towards the WTRU via a WiFi access point (AP), for example, such that the data bypasses the eNB and/or the first bearer. The GW may receive data via a WiFi access point (AP), for example, such that the data bypasses the eNB and/or the first bearer. The data may be associated with the WTRU. For example, the data may be sent from the WTRU. The GW may send the data to a serving gateway (SGW) via the second bearer.

The GW may determine to send communications towards the WTRU via the first bearer. For example, the GW may determine to send communications towards the WTRU via the first bearer in response to receiving a non-access stratum (NAS) Service Request message. The GW may send a paging message to the eNB to reestablish a communication path associated with the WTRU and the eNB. The GW may receive a non-access stratum (NAS) Service Request message. The GW may send a third message to the eNB to reestablish the first bearer. The third message may include an Evolved Universal Terrestrial Radio Access Network (EUTRAN) Radio access bearer (E-RAB) setup request.

DETAILED DESCRIPTION

Figure 1A:
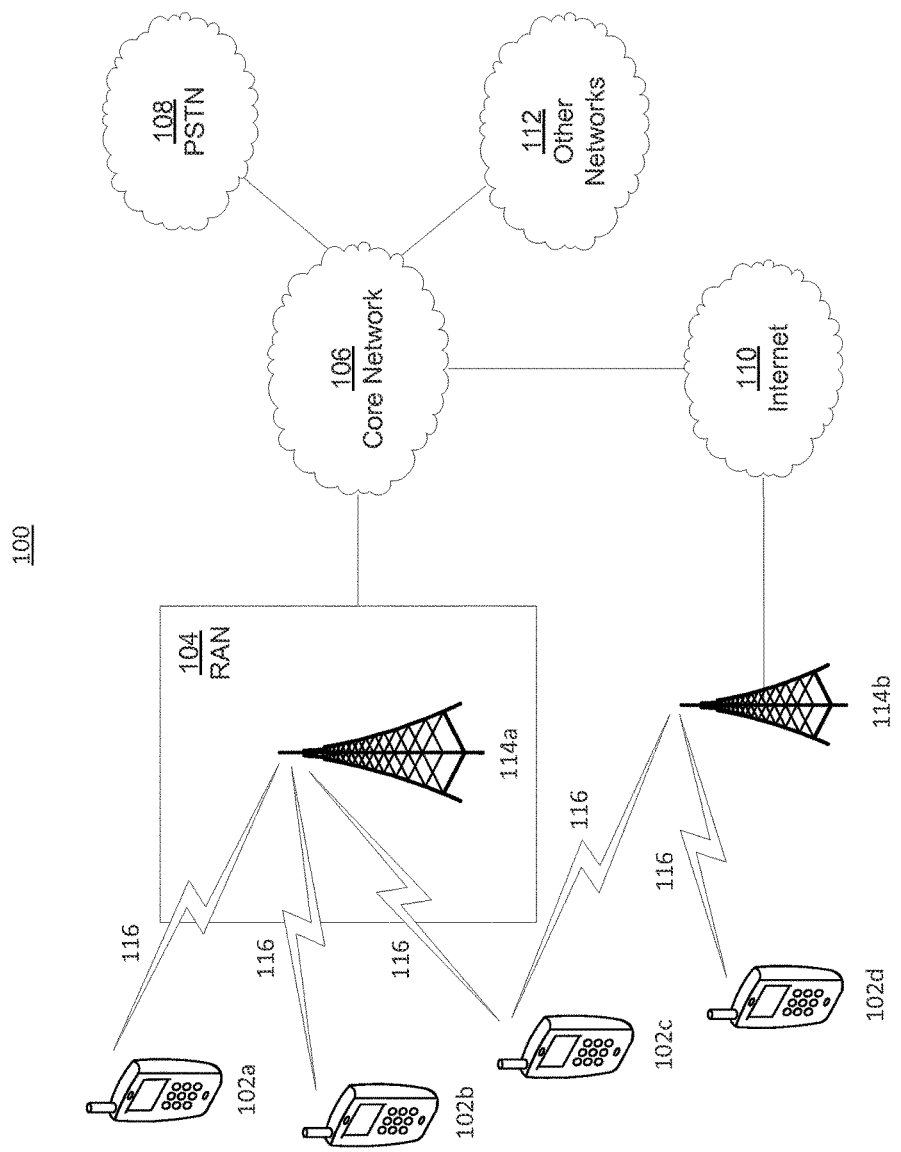
FIG. 1A depicts a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include at least one wireless transmit/receive unit (WTRU), such as a plurality of WTRUs, for instance WTRUs 102a, 102b, 102c, and 102d, a radio access network (RAN) 104, a core network 106, a public switched telephone network (PSTN) 108, the Internet 110, and other networks 112, though it should be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it should be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, e.g., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a. 102b, 102c may implement radio technologies such as IEEE 802.16 (e.g., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b. 102c. 102d. For example, the core network 106 may provide call control, billing services, mobile location-based services, pre-paid calling, Internet connectivity, video distribution, etc., and/or perform high-level security functions, such as user authentication. Although not shown in FIG. 1A, it should be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, e.g., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
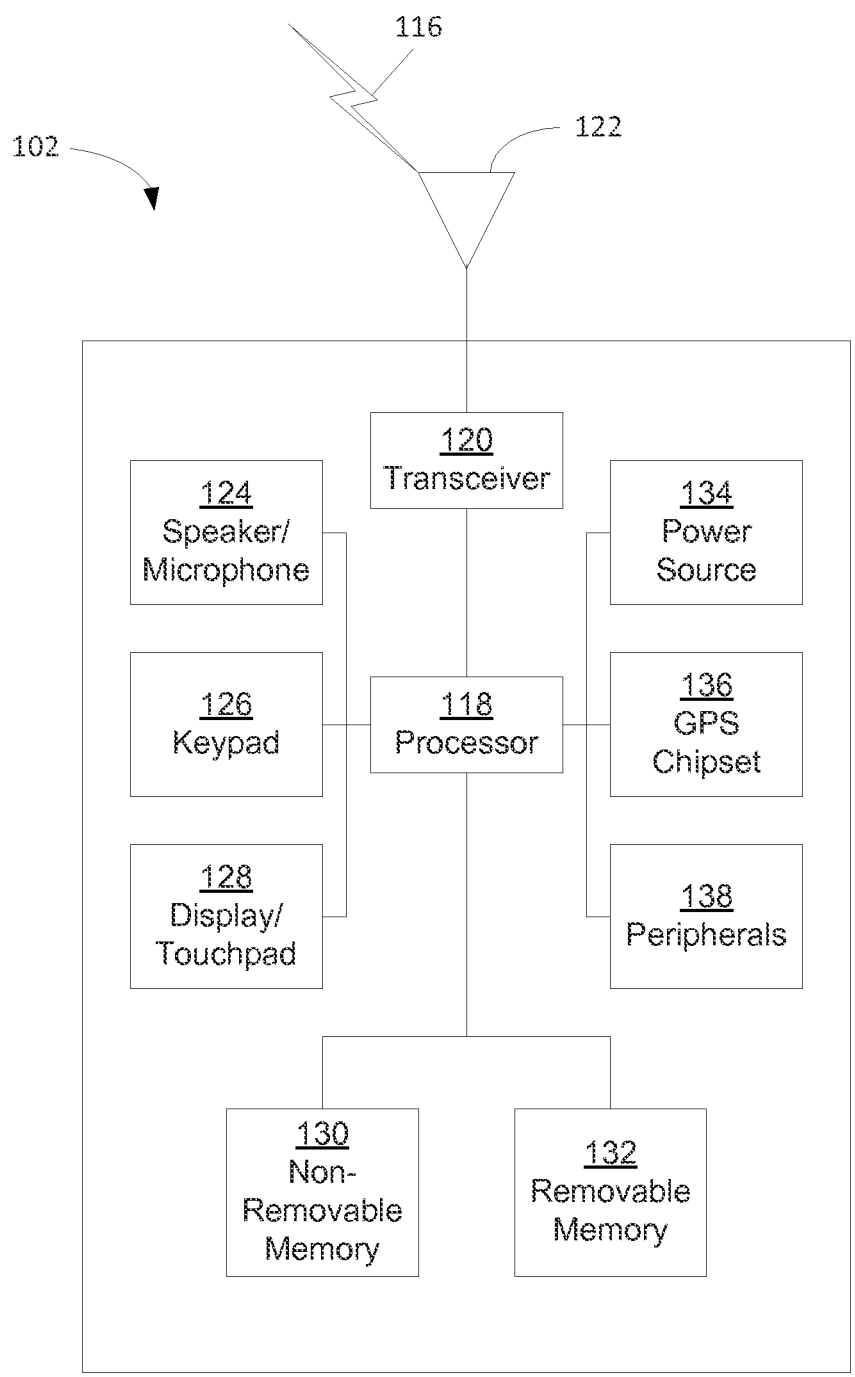
FIG. 1B depicts a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It should be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it should be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It should be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It should be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
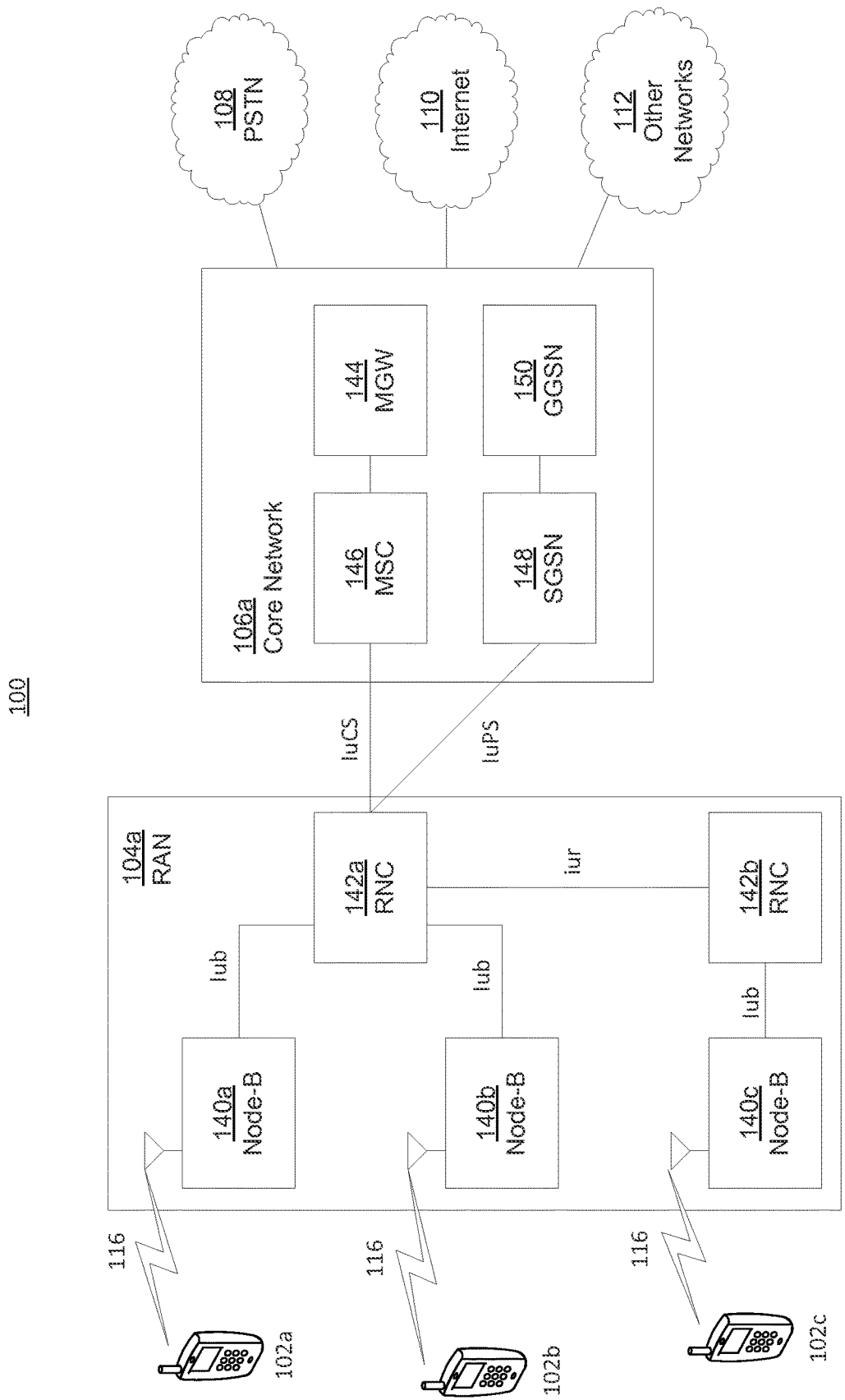
FIG. 1C depicts a system diagram of an example radio access network and an example core network that may be used within the communications system illustrated in FIG. 1A.

FIG. 1C is a system diagram of an embodiment of the communications system 100 that includes a RAN 104a and a core network 106a that comprise example implementations of the RAN 104 and the core network 106, respectively. As noted above, the RAN 104, for instance the RAN 104a, may employ a UTRA radio technology to communicate with the WTRUs 102a, 102b, and 102c over the air interface 116. The RAN 104a may also be in communication with the core network 106a. As shown in FIG. 1C, the RAN 104a may include Node-Bs 140a, 140b, 140c, which may each include one or more transceivers for communicating with the WTRUs 102a, 102b, 102c over the air interface 116. The Node-Bs 140a, 140b, 140c may each be associated with a particular cell (not shown) within the RAN 104a. The RAN 104a may also include RNCs 142a. 142b. It should be appreciated that the RAN 104a may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106a shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements is depicted as part of the core network 106a, it should be appreciated that any one of these elements may be owned and/or operated by an entity other than the core network operator.

The RNC 142a in the RAN 104a may be connected to the MSC 146 in the core network 106a via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 104a may also be connected to the SGSN 148 in the core network 106a via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106a may also be connected to the networks 112, which may include other wired or wireless networks that are owned and/or operated by other service providers.

Figure 1D:
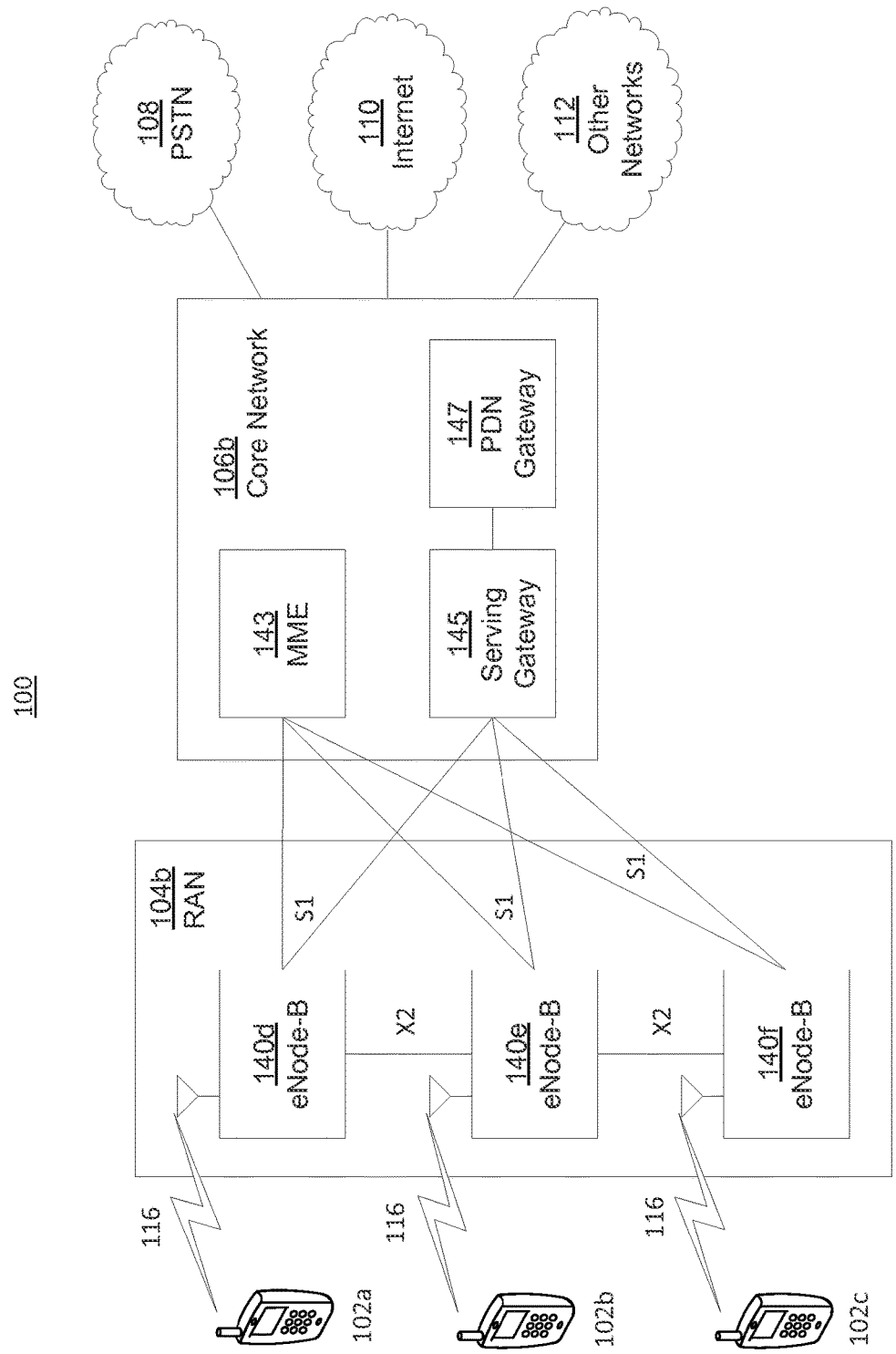
FIG. 1D depicts a system diagram of an example radio access network and an example core network that may be used within the communications system illustrated in FIG. 1A.

FIG. 1D is a system diagram of an embodiment of the communications system 100 that includes a RAN 104b and a core network 106b that comprise example implementations of the RAN 104 and the core network 106, respectively. As noted above, the RAN 104, for instance the RAN 104b, may employ an E-UTRA radio technology to communicate with the WTRUs 102a, 102b, and 102c over the air interface 116. The RAN 104b may also be in communication with the core network 106b.

The RAN 104b may include eNode-Bs 140d, 140e, 140f, though it should be appreciated that the RAN 104b may include any number of eNode-Bs while remaining consistent with an embodiment. The eNode-Bs 140d, 140e, 140f may each include one or more transceivers for communicating with the WTRUs 102a, 102b, 102c over the air interface 116. In one embodiment, the eNode-Bs 140d, 140e, 140f may implement MIMO technology. Thus, the eNode-B 140d, for example, may use multiple antennas to transmit wireless signals to, and receive wireless signals from, the WTRU 102a.

Each of the eNode-Bs 140d, 140e, and 140f may be associated with a particular cell (not shown) and may be configured to handle radio resource management decisions, handover decisions, scheduling of users in the uplink and/or downlink, and the like. As shown in FIG. 1D, the eNode-Bs 140d, 140e, 140f may communicate with one another over an X2 interface.

The core network 106b shown in FIG. 1D may include a mobility management gateway (MME) 143, a serving gateway 145, and a packet data network (PDN) gateway 147. While each of the foregoing elements is depicted as part of the core network 106b, it should be appreciated that any one of these elements may be owned and/or operated by an entity other than the core network operator.

The MME 143 may be connected to each of the eNode-Bs 140d, 140e, and 140f in the RAN 104b via an S1 interface and may serve as a control node. For example, the MME 143 may be responsible for authenticating users of the WTRUs 102a, 102b, 102c, bearer activation/deactivation, selecting a particular serving gateway during an initial attach of the WTRUs 102a, 102b, 102c, and the like. The MME 143 may also provide a control plane function for switching between the RAN 104b and other RANs (not shown) that employ other radio technologies, such as GSM or WCDMA.

The serving gateway 145 may be connected to each of the eNode Bs 140d, 140e, 140f in the RAN 104b via the S1 interface. The serving gateway 145 may generally route and forward user data packets to/from the WTRUs 102a, 102b, 102c. The serving gateway 145 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 145 may also be connected to the PDN gateway 147, which may provide the WTRUs 102a, 102b, 102c with access to packet-switched networks, such as the Internet 110, to facilitate communications between the WTRUs 102a, 102b, 102c and IP-enabled devices.

The core network 106b may facilitate communications with other networks. For example, the core network 106b may provide the WTRUs 102a, 102b, 102c with access to circuit-switched networks, such as the PSTN 108, to facilitate communications between the WTRUs 102a, 102b, 102c and traditional land-line communications devices. For example, the core network 106b may include, or may communicate with, an IP gateway (e.g., an IP multimedia subsystem (IMS) server) that serves as an interface between the core network 106b and the PSTN 108. In addition, the core network 106b may provide the WTRUs 102a, 102b, 102c with access to the networks 112, which may include other wired or wireless networks that are owned and/or operated by other service providers.

Figure 1E:
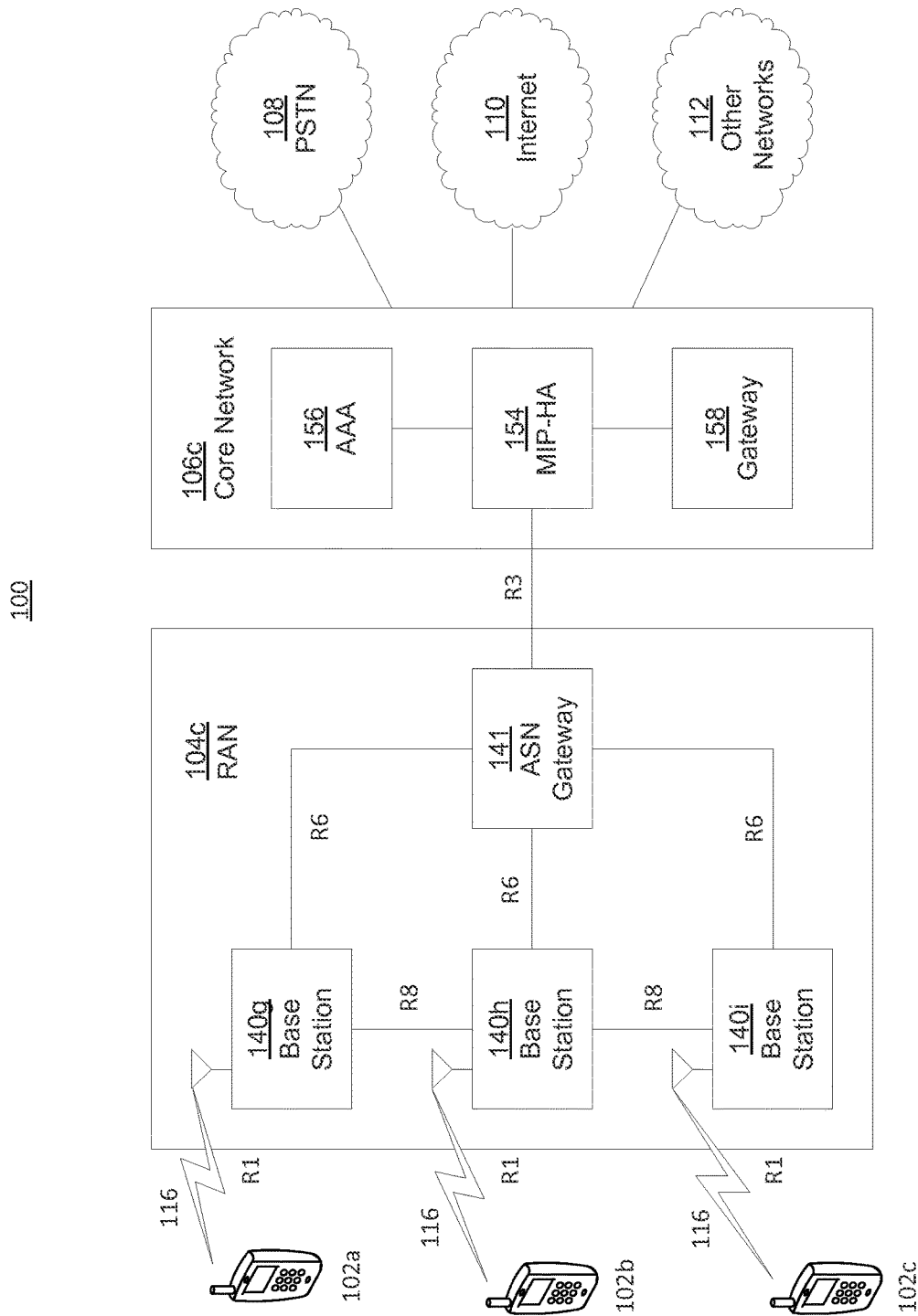
FIG. 1E depicts a system diagram of an example radio access network and an example core network that may be used within the communications system illustrated in FIG. 1A.

FIG. 1E is a system diagram of an embodiment of the communications system 100 that includes a RAN 104c and a core network 106c that comprise example implementations of the RAN 104 and the core network 106, respectively. The RAN 104, for instance the RAN 104c, may be an access service network (ASN) that employs IEEE 802.16 radio technology to communicate with the WTRUs 102a, 102b, and 102c over the air interface 116. As described herein, the communication links between the different functional entities of the WTRUs 102a. 102b, 102c, the RAN 104c, and the core network 106c may be defined as reference points.

As shown in FIG. 1E, the RAN 104c may include base stations 102a, 102b, 102c, and an ASN gateway 141, though it should be appreciated that the RAN 104c may include any number of base stations and ASN gateways while remaining consistent with an embodiment. The base stations 102a, 102b, 102c may each be associated with a particular cell (not shown) in the RAN 104c and may each include one or more transceivers for communicating with the WTRUs 102a, 102b, 102c over the air interface 116. In one embodiment, the base stations 140g, 140h, 140i may implement MIMO technology. Thus, the base station 140g, for example, may use multiple antennas to transmit wireless signals to, and receive wireless signals from, the WTRU 102a. The base stations 140g, 140h, 140i may also provide mobility management functions, such as handoff triggering, tunnel establishment, radio resource management, traffic classification, quality of service (QoS) policy enforcement and the like. The ASN Gateway 141 may serve as a traffic aggregation point and may be responsible for paging, caching of subscriber profiles, routing to the core network 106c, and the like.

The air interface 116 between the WTRUs 102a, 102b, 102c and the RAN 104c may be defined as an R1 reference point that implements the IEEE 802.16 specification. In addition, each of the WTRUs 102a, 102b, and 102c may establish a logical interface (not shown) with the core network 106c. The logical interface between the WTRUs 102a, 102b, 102c and the core network 106c may be defined as an R2 reference point, which may be used for authentication, authorization. IP host configuration management, and/or mobility management.

The communication link between each of the base stations 140g, 140h, 140i may be defined as an R8 reference point that includes protocols for facilitating WTRU handovers and the transfer of data between base stations. The communication link between the base stations 140g, 140h, 140i and the ASN gateway 141 may be defined as an R6 reference point. The R6 reference point may include protocols for facilitating mobility management based on mobility events associated with each of the WTRUs 102a. 102b, 102c.

As shown in FIG. 1E, the RAN 104c may be connected to the core network 106c. The communication link between the RAN 104c and the core network 106c may defined as an R3 reference point that includes protocols for facilitating data transfer and mobility management capabilities, for example. The core network 106c may include a mobile IP home agent (MIP-HA) 144, an authentication, authorization, accounting (AAA) server 156, and a gateway 158. While each of the foregoing elements is depicted as part of the core network 106c, it should be appreciated that any one of these elements may be owned and/or operated by an entity other than the core network operator.

The MIP-HA may be responsible for IP address management, and may enable the WTRUs 102a, 102b, and 102c to roam between different ASNs and/or different core networks. The MIP-HA 154 may provide the WTRUs 102a, 102b, 102c with access to packet-switched networks, such as the Internet 110, to facilitate communications between the WTRUs 102a, 102b, 102c and IP-enabled devices. The AAA server 156 may be responsible for user authentication and for supporting user services. The gateway 158 may facilitate interworking with other networks. For example, the gateway 158 may provide the WTRUs 102a, 102b, 102c with access to circuit-switched networks, such as the PSTN 108, to facilitate communications between the WTRUs 102a, 102b, 102c and traditional landline communications devices. In addition, the gateway 158 may provide the WTRUs 102a, 102b, 102c with access to the networks 112, which may include other wired or wireless networks that are owned and/or operated by other service providers.

Although not shown in FIG. 1E, it should be appreciated that the RAN 104c may be connected to other ASNs and the core network 106c may be connected to other core networks. The communication link between the RAN 104c the other ASNs may be defined as an R4 reference point, which may include protocols for coordinating the mobility of the WTRUs 102a, 102b, 102c between the RAN 104c and the other ASNs. The communication link between the core network 106c and the other core networks may be defined as an R5 reference point, which may include protocols for facilitating interworking between home core networks and visited core networks.

Figure 2:
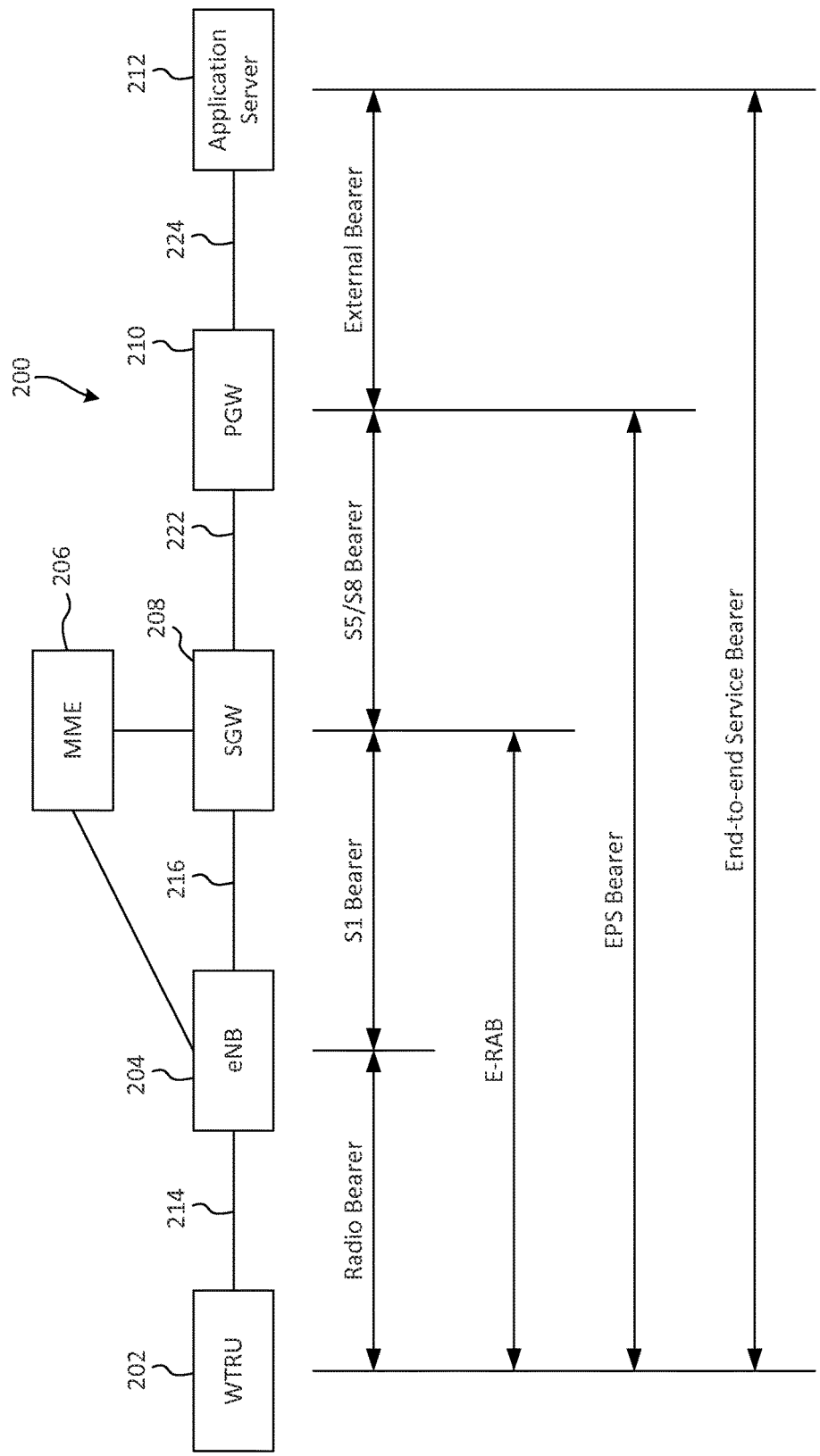
FIG. 2 is a block diagram depicting example bearers established between a wireless transmit/receive unit (WTRU) and an Evolved Packet Core (EPC) network.

FIG. 2 is a block diagram 200 depicting example bearers established between a WTRU 202 and an Evolved Packet Core (EPC) network. A Radio Bearer 214 may be established between the WTRU 202 and an eNB 204 (e.g., via an over the air interface). An S1 Bearer 216 (e.g., using a GPRS Tunneling Protocol (GTP)) may be established between the eNB 204 and an SGW 208. An S5 and/or S8 Bearer 222 may be established between the SGW 208 and a PGW 210. If the bearer 222 between the SGW 208 and the PGW 210 uses a GTP, then the bearer 222 may be referred to as an S5 Bearer. A bearer 224 (e.g., an external bearer) may be established between the PGW 210 and an Application Server 212. The Radio Bearer 214 and the S1 Bearer 216 may be referred to as an Evolved UMTS Terrestrial Radio Access Network (EUTRAN) Radio Access Bearer (E-RAB). The E-RAB together with the S5 and/or S8 Bearer 222 may be referred to as an Evolved Packet System (EPS) Bearer. The bearers from the WTRU 202 to the Application Server 212 may collectively be referred to as an End-to-end Service Bearer. Teardown of a bearer may refer to the removal of a bearer. For example, teardown of a bearer may refer to the removal of a bearer such that the bearer may no longer be physically present, but may be logically present. The physical bearer may refer to dedicated physical resources that may be allocated to a WTRU. The logical resources may refer to data structure(s) between two or more network entities (e.g., the MME, eNB, and GW).

Figure 3A:
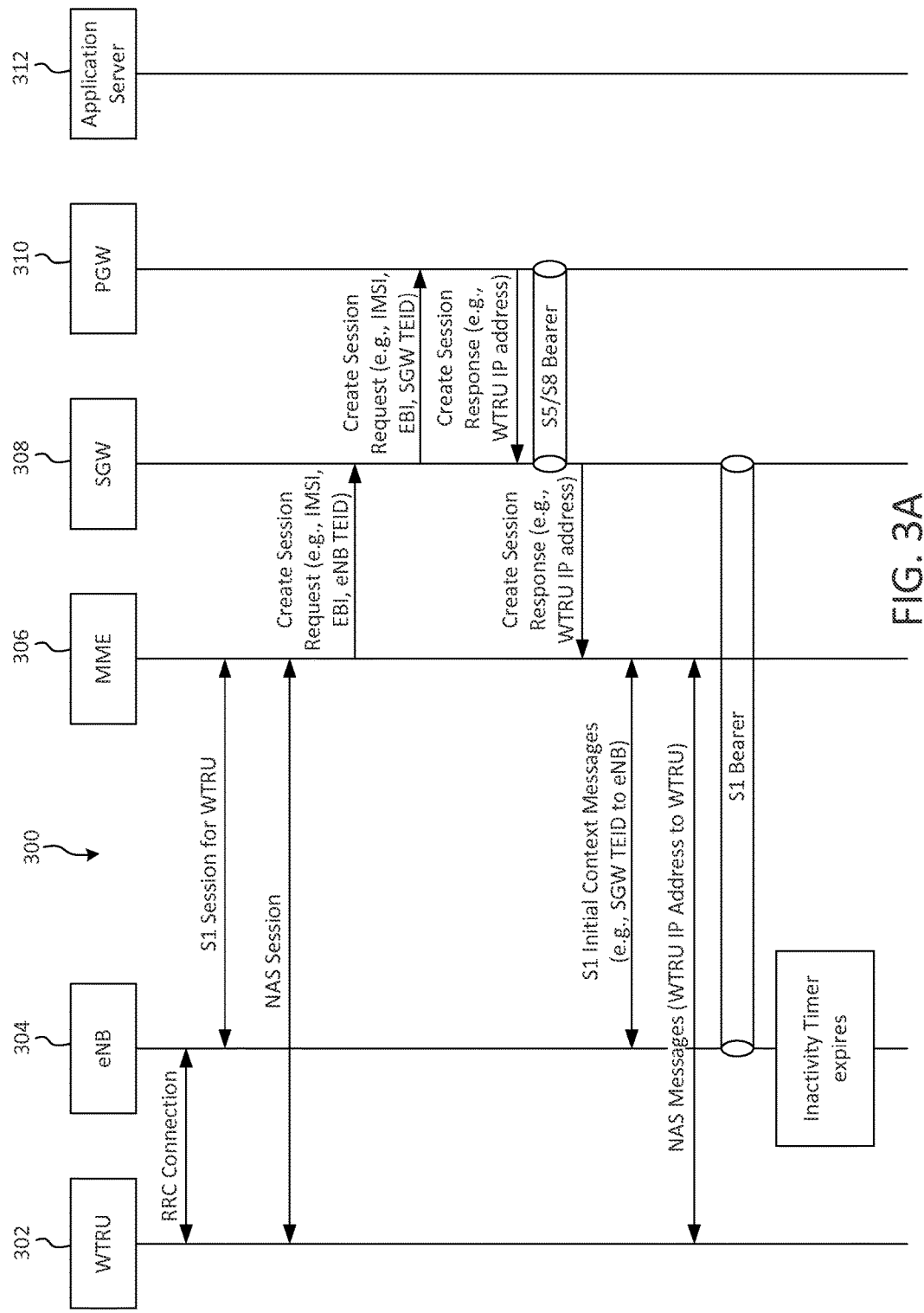
FIGS. 3A-3C depict example LTE inactivity timer message sequence charts.
Figure 3B:
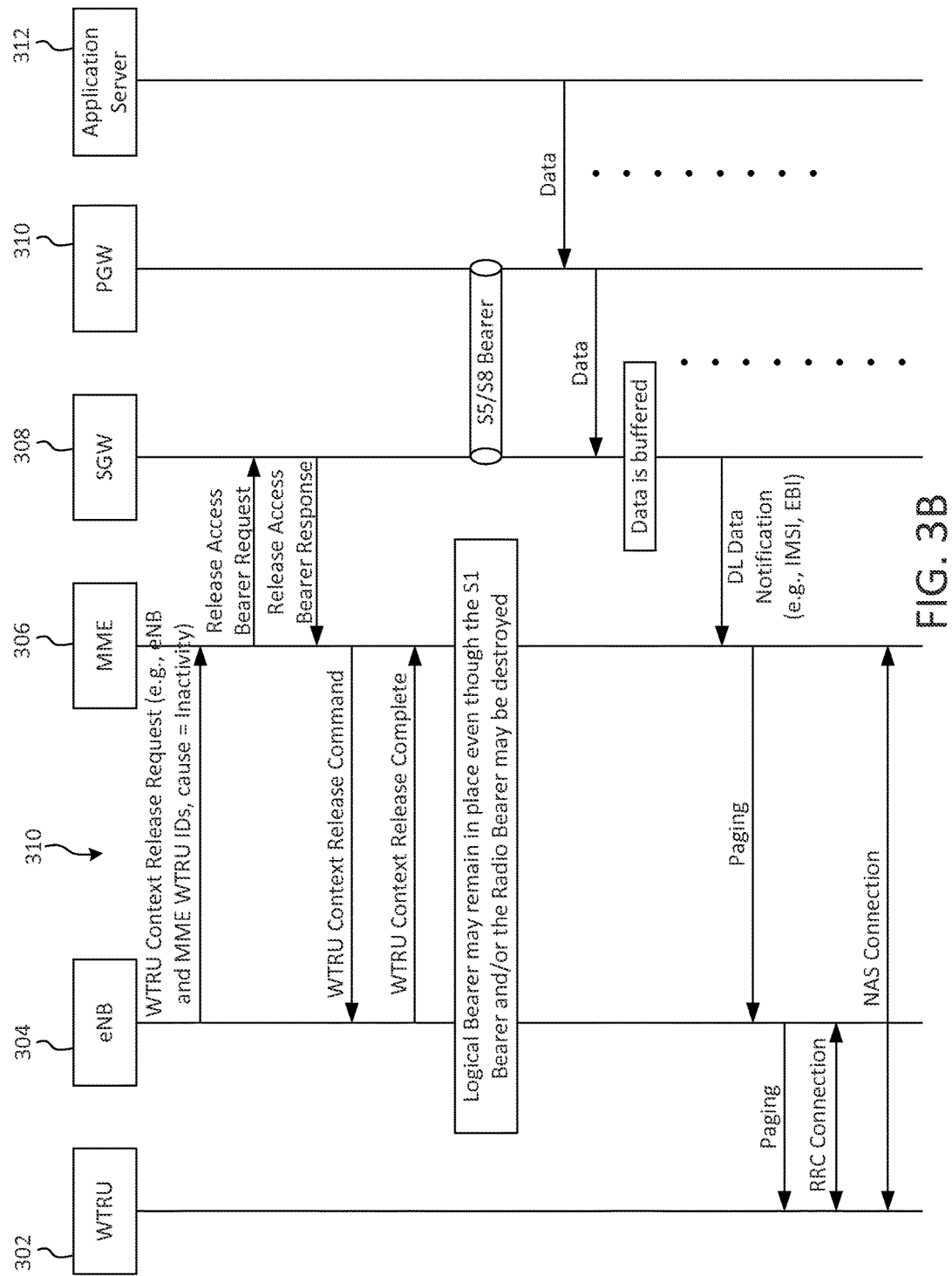
Figure 3C:
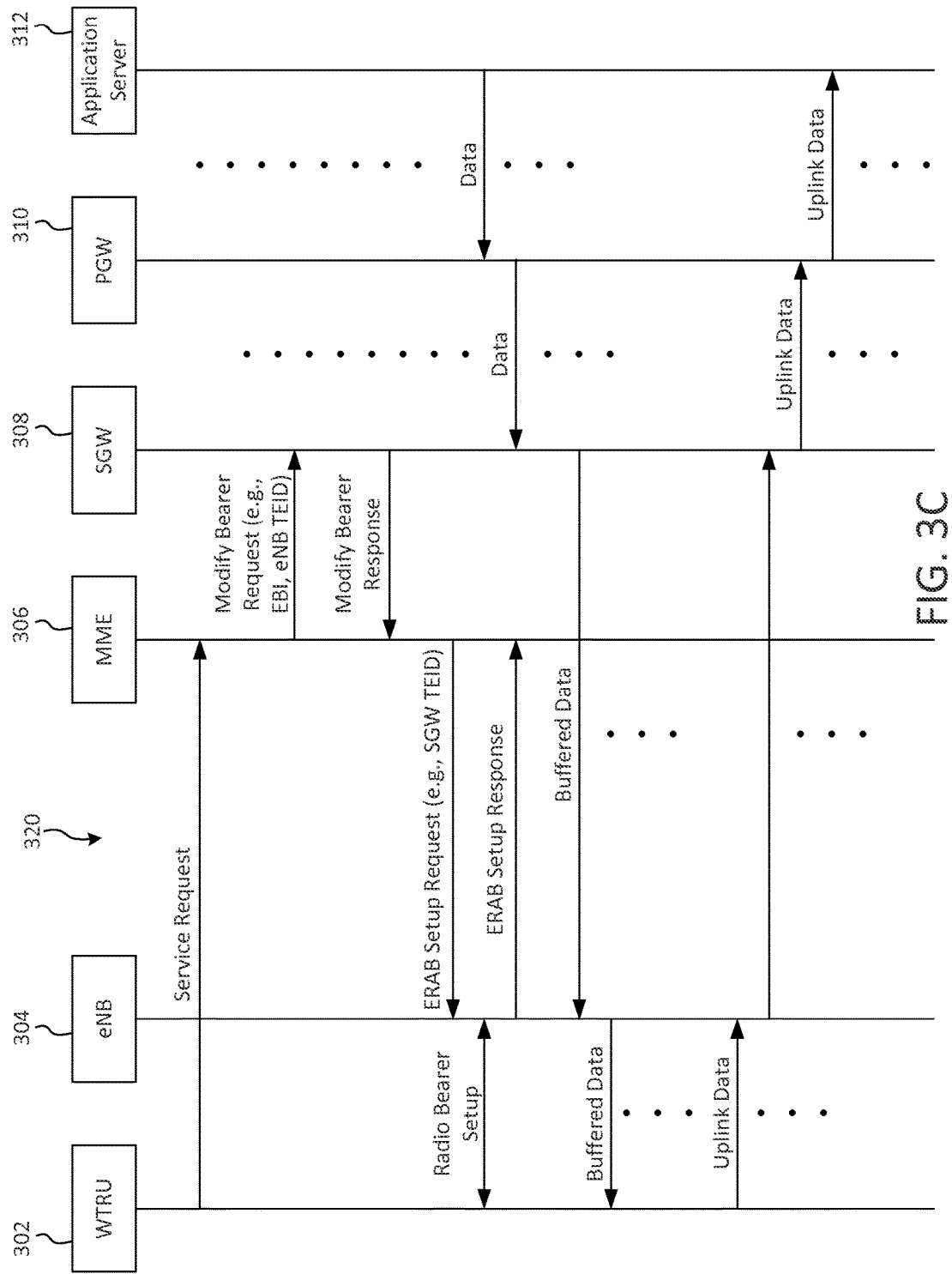

FIGS. 3A-3C depict example inactivity timer message sequence charts, including teardown and reestablishment of an E-RAB. FIG. 3A depicts an example inactivity timer message sequence chart 300. An eNB 3042 may be configured to maintain an inactivity timer for one or more WTRUs associated with the eNB 304 (e.g., each WTRU associated with the eNB). For example, when a WTRU 302 connects to the EPC, it may transition from an idle mode to a connected mode. When the WTRU 302 achieves connected mode, the eNB 304 may start an inactivity timer for the WTRU 302. If the WTRU 302 does not transmit and/or receive data over the radio bearer (e.g., a cellular link) before the inactivity timer expires, the eNB 304 may attempt to have at least a portion of the E-RAB torn down. Teardown of the E-RAB may include removing (e.g., deleting) the radio bearer between the eNB 304 and the WTRU 302 and/or removing the S1 Bearer between the eNB 304 and the SGW 308. After teardown of the E-RAB has occurred, the E-RAB may no longer be physically present, but may be logically present. The S5/S8 Bearer may remain in place between the SGW 308 and a PGW 310. An external bearer between the PGW 310 and an application server 312 may remain in place.

FIG. 3B depicts an example inactivity timer message sequence chart 310, including teardown of an E-RAB. Partial and/or total removal of the E-RAB, for example due to expiration of the inactivity timer, may negatively impact resource utilization in the cellular communications system. For example, the WTRU 302 may communicate with the SGW 308 via an entity (e.g., a WiFi access point, and/or the like) that uses at least a portion of the E-RAB but bypasses the eNB 304, for example, such that the inactivity timer may expire. Expiration of the inactivity timer may cause the E-RAB to be torn down, which may cause the E-RAB to be reestablished in order to enable downlink communications (e.g., from the SGW 308 to the WTRU 302). Cyclical tear down and/or reestablishment of the E-RAB may undesirably consume resources of the cellular communications system. Teardown of the E-RAB may cause uplink communications (e.g., from the WTRU 302 to the SGW 308) to be delayed and/or dropped.

The E-RAB teardown procedure may be performed to allow the WTRU 302 to save battery life, for example, since the radio bearer may be removed. The WTRU 302 may wake-up, for example, in accordance with a paging occasion(s) to listen for one or more pages. The E-RAB teardown procedure may allow eNB resources to be otherwise utilized, for example, by allowing the eNB resources to be applied to one or more other active users.

FIG. 3C depicts an example inactivity timer message sequence chart 320, including reestablishment of an E-RAB. If data is sent to the WTRU 302, for example by the application server 312, or if the WTRU 302 sends data to an entity on a public Internet side of the PGW 310, for example the application server 312, the radio bearer and/or the S1 bearer may be reestablished.

If the application server 312 has data to send to the WTRU 302, the application server 312 may send the data to the PGW 310. If the S5 bearer and/or S8 bearer is in place, the PGW 310 may send the data to the SGW 308 via the S5 bearer and/or S8 Bearer. The SGW 308 may receive the data. The SGW 308 may not know what to do with the data. The SGW 308 may buffer the data.

The SGW 308 may contact an MME 306 (e.g., substantially simultaneously to receiving the data), for example, via a GTP Downlink Data Notification message. The message may include an International Mobile Subscriber Identity (IMSI) and/or another identifying characteristic associated with the WTRU 302 that is the target of the data. The MME 306 may issue a paging message over an interface (e.g., an S1 interface), for example, to one or more eNBs (e.g., eNB 304) that it controls (e.g., all eNBs that the MME controls).

The one or more eNBs (e.g., each eNB) may issue the paging message. The WTRU 302 that is the intended recipient of the data may respond to the paging message.

The WTRU 302 and the eNB 304 may establish a Radio Resource Control (RRC) connection. An E-RAB reestablishment procedure may be performed with the eNB 304 from the previous, torn down E-RAB and/or with a different eNB. The WTRU 302 may establish a Non-Access-Stratum (NAS) session with the MME 306. The WTRU 302 may issue a NAS Service Request message. The MME 306 may receive the NAS Service Request message. The MME 306 may facilitate the establishment of a tunnel (e.g., a GTP tunnel) between the eNB 304 and the SGW 308 and/or the establishment of a radio bearer between the eNB 304 and the WTRU 302 to service the data. With the tunnel is in place, the SGW 308 may send downlink data towards the WTRU 302, for example using the GTP tunnel. The eNB 304 may use the radio bearer to deliver the data to the WTRU 302.

If the WTRU 302 has data to send to the application server 312, a similar process may be performed. The WTRU 302 may request the establishment of an RRC connection with the eNB 304. The WTRU 302 may establish a NAS session with the MME 306, for example, over the RRC connection. The MME 306 may facilitate the establishment of a tunnel (e.g., a GTP tunnel) between the eNB 304 and the SGW 308 and/or the establishment of a radio bearer between the eNB 304 and the WTRU 302 to service the data. With the tunnel and/or radio bearer established, the data from the WTRU 302 may traverse the radio bearer to reach the eNB 304. The eNB 304 may forward the data to the SGW 308, for example via the S1 bearer. The SGW 308 may forward the data to the PGW 310, for example via the S5/S8 Bearer. The PGW 310 may send the data towards the application server 312, for example via an external bearer.

Figure 4:
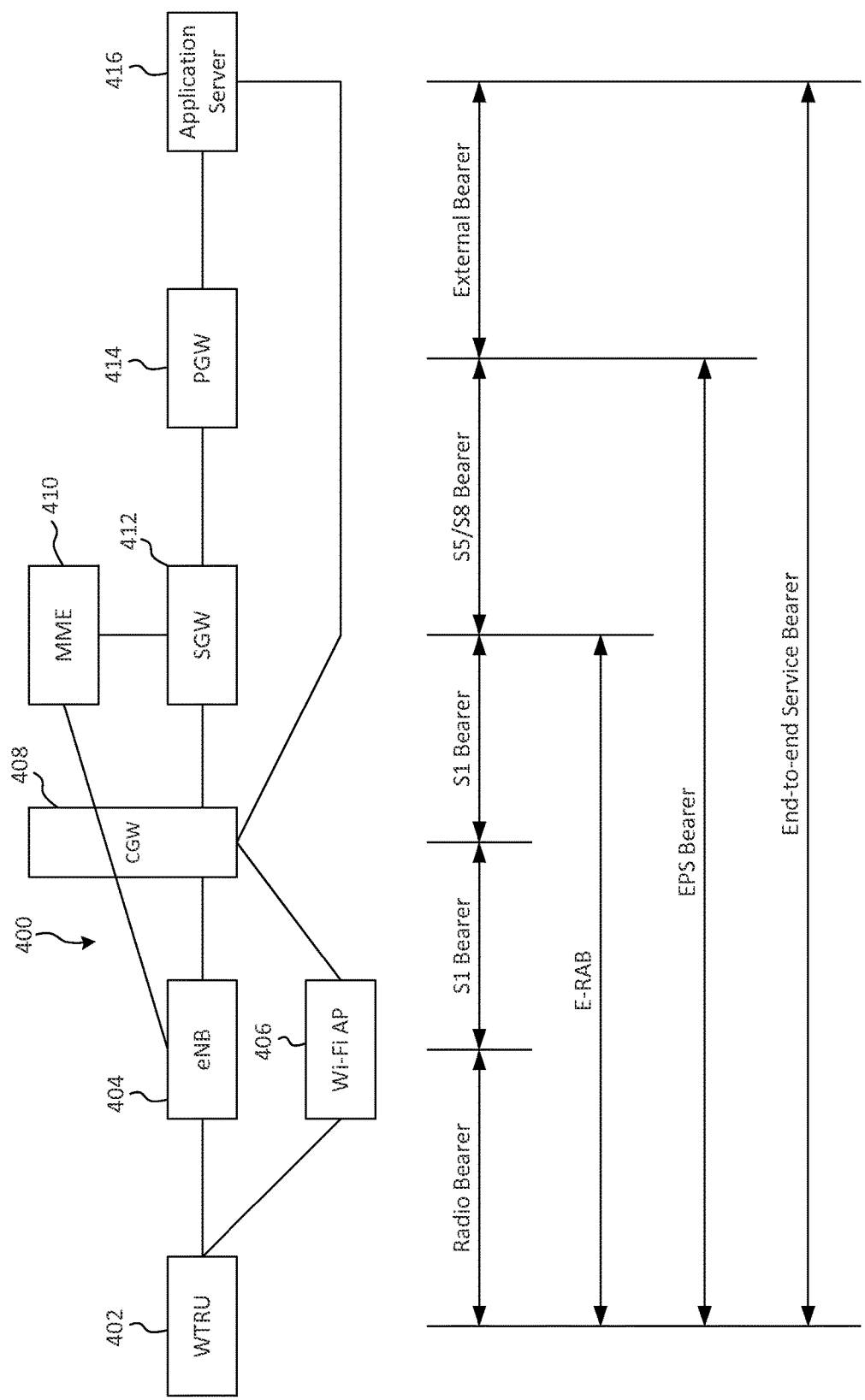
FIG. 4 depicts an example cellular communications architecture that includes a standalone Converged Gateway (CGW).

FIG. 4 depicts an example cellular communications architecture 400 that includes a standalone Converged Gateway (CGW). An inactivity timer may be implemented in a cellular communications architecture that employs one or more entities that may facilitate communication between a WTRU 402 and an application server 416. A Converged Gateway (CGW) 408 may facilitate communication between the WTRU 402 and the application server 416. For example, the CGW 408 may facilitate communication between the WTRU 402 and the application server 416 via one or more of an eNB 404, a Wi-Fi access point (AP) 406, an SGW 412, and/or a PGW 414. The CGW 408 be may be a Local Gateway (LGW). For example, a CGW 408, an LGW, and/or the like may be located between an eNB 404 with which the WTRU 402 is associated and an associated SGW 412 and/or MME 410. The CGW 408 may be a standalone physical entity, for example as depicted in FIG. 4. The CGW 408 may be a standalone device such that two S1 Bearers may be created, for example, which may include a first S1 Bearer connecting the eNB 404 to the CGW 408 and a second S1 Bearer connecting the CGW 408 to the SGW 412.

Figure 5:
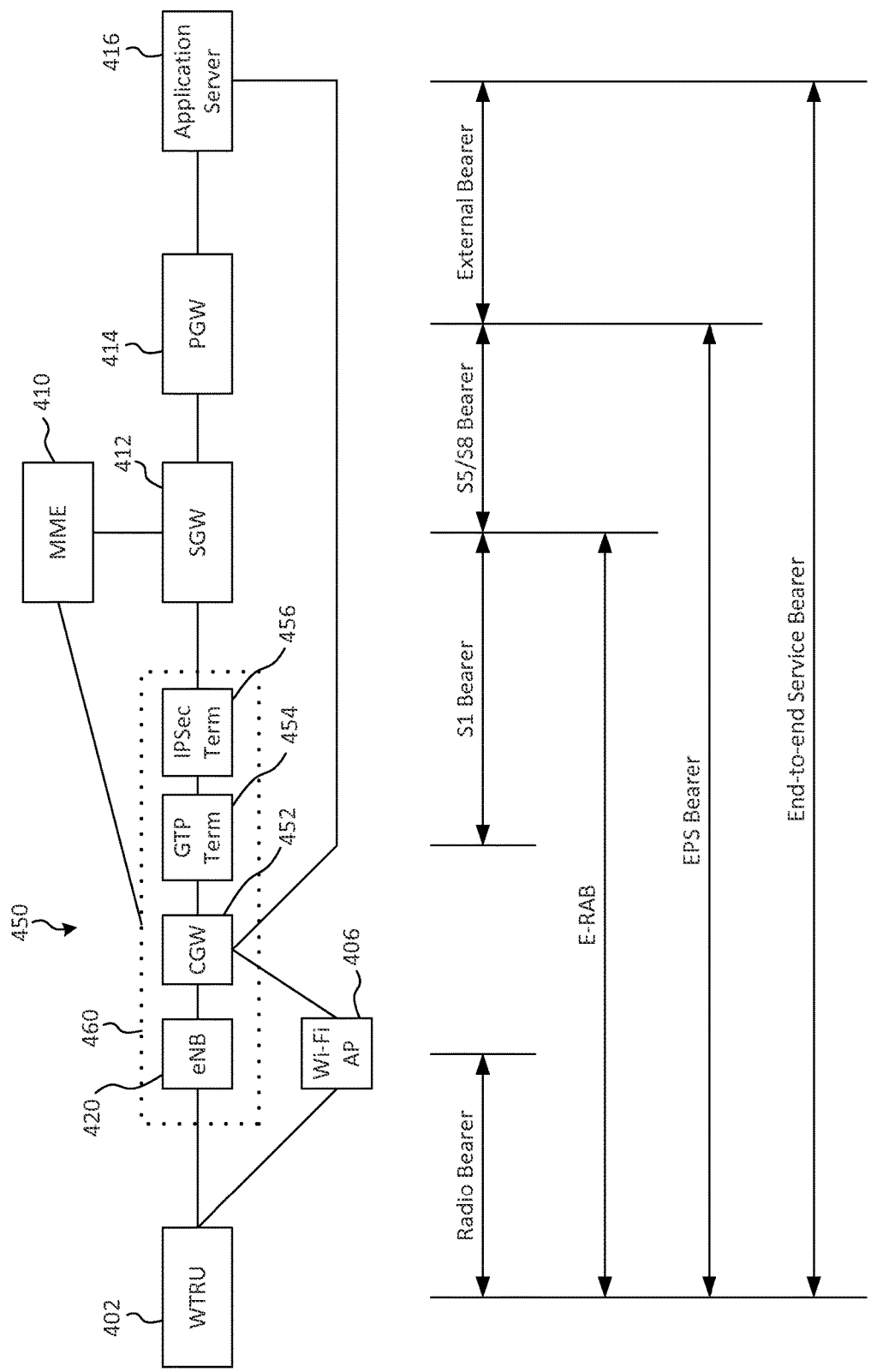
FIG. 5 depicts an example cellular communications architecture that includes an Evolved Node B (eNB) having an integrated CGW.

FIG. 5 depicts an example cellular communications architecture 450 that includes an Evolved Node B (eNB) 460 having an integrated CGW 452. The eNB 460 may include a sub-eNB 420, the integrated CGW 452, a GTP termination 454, and/or an IP Sec termination 456. The sub-eNB 420 may include some of the functionality of an eNB (e.g., eNB 404). For example, the sub-eNB 420 may include the functionality of an eNB (e.g., eNB 404) minus the GTP termination 454 and the IP Sec termination 456. The MME 410 may communicate with the eNB 460. For example, the MME 410 may communicate with the sub-eNB 420 and/or the CGW 452. The architecture 450 may be substantially similar as the architecture 400 with the exception that the CGW 452 may be integrated with the eNB 460.

The CGW 452 may be a logical and/or functional entity that may be integrated with (e.g., embedded within) the eNB 460, for example as depicted in FIG. 5. The CGW 452 may be integrated with the eNB 460 such that a space is defined between the radio bearer and the S1 bearer. The space may be occupied by the CGW 452. A radio bearer may be established between the WTRU 402 and the eNB, for example, when the CGW 452 is integrated with the eNB 460. An S1 bearer may be established between the eNB 460 (e.g., the GTP termination 454 of the eNB 460) and the SGW 412, for example, when the CGW 452 is integrated with the eNB 460. Although the Wi-Fi AP 406 is illustrated as a separate unit from the eNB 460, the Wi-Fi AP 406 may be integrated within the eNB 460 (e.g., the eNB 460 may refer to a Home eNB (HeNB) that includes a Wi-Fi AP (e.g., Wi-Fi AP 406)), for example, in the configuration of FIG. 4 and/or of FIG. 5.

FIGS. 4 and 5 may depict example bearer configurations that may result from the respective locations of the CGW and depict examples of local Selected IP Traffic Offload (SIPTO) that may be performed by the respective CGWs. Implementation of the CGW is not limited to the architectures illustrated in FIGS. 4 and 5.

Architectures (e.g., the example CGW architectures depicted in FIGS. 4 and 5) may be affected by the expiration of an eNB Inactivity timer. For example, an inactivity timer may be set to expire in less than approximately one minute. The inactivity timer may expire frequently when Wi-Fi is used to offload cellular data transmission.

If the CGW or another entity routes data between itself and the WTRU via a Wi-Fi access point (AP), for example, data may not pass through the eNB. For example, the data path may be WTRU-Wi-Fi AP-CGW-SGW-PGW-Application Server for uplink and the opposite for downlink data. If no data traverses the eNB, the inactivity timer maintained by the eNB may expire, which may trigger teardown of the E-RAB. Teardown of the radio bearer between the eNB and WTRU may be relatively inconsequential to performance of the CGW, since the CGW may still send and/or receive data via a link to the Wi-Fi AP. Teardown of the S1 bearer between the eNB and the SGW may detrimentally impact performance of the CGW and/or one or more other network components. For example, if the CGW is integrated with the eNB (e.g., as depicted in FIG. 5), the eNB and/or the MME may operate to tear down the S1 bearer connecting the CGW to the SGW. Similarly, if the CGW is located between the eNB and the SGW (e.g., as depicted in FIG. 4), the eNB and/or the MME may operate to tear down the S1 bearer between the eNB and the SGW, which may include teardown of both a first S1 bearer between the eNB and the CGW and a second S1 bearer between the CGW and the SGW.

Teardown of the S1 bearer may be problematic because the CGW may still be using the S1 bearer to interface to the SGW. For example, the S1 bearer may be part of a communication path, for example, that may include the S5/S8 Bearer between the SGW and the PGW, and/or an external bearer, e.g., so as to deliver data to and/or receive data from an application server.

If the radio bearer and/or the S1 bearer is removed, for example as a result of the inactivity timer expiring in the eNB, and the Application Server sends downlink data towards the WTRU, then the downlink data may reach the SGW, but it may be delayed. For example, since the radio bearer and/or the S1 bearer has been removed (e.g., due to the expiration of the inactivity timer), the SGW may trigger the reestablishment of the radio bearer and/or the S1 bearer (e.g., via a GTP Downlink Data Notification message). The WTRU may be paged. The radio bearer and/or the S1 bearer may be reestablished. The inactivity timer may be reset. The inactivity timer may expire again, resulting in another teardown of the radio bearer and/or the S1 Bearer. This cycle of the radio bearer and/or the S1 bearer teardown and reestablishment may continue for as long as the application server sends downlink data towards the WTRU. The timer expiration may cause excess resource consumption as the system repeats the cycle of radio bearer and/or S1 bearer teardown and reestablishment. The timer expiration may cause inefficient data delivery from the application server to the WTRU.

Removal of the radio bearer and/or the S1 bearer, for example as a result of inactivity timer expiry in the eNB, may have an impact on uplink data sent from the WTRU toward an application server, for example. For example, if the WTRU has uplink data to send to the application server, the WTRU may send the data toward the application server via its link to a Wi-Fi AP. Once the data reaches the Wi-Fi AP, the data may be forwarded to the CGW. However, if the S1 bearer has been removed, the CGW may be unable to push the data towards the SGW. As a result, the CGW may drop the uplink data. The above described impacts to CGW performance may occur regardless of whether an eNB, an HeNB, and/or the like is used.

One or more of the following may be implemented. The eNB inactivity timer may be set to infinite, which for example may prevent teardown of the E-RAB. One or more policies used by the CGW may be configured such that the CGW does not use a Wi-Fi interface exclusively for sending and/or receiving data (e.g., the cellular interface may be used). The eNB inactivity timer maybe allowed to expire, the E-RAB may be removed, and/or the CGW may be configured to employ Local-SIPTO to transport data to and from an application server. The CGW may intervene, for example such that the radio bearer and/or the S1 bearer between the eNB and the CGW may be removed, but the S1 bearer between the CGW and SGW may remain in place. The MME and/or the eNB may be configured to be aware of the CGW, which for example may allow the MME and/or the eNB to remove the radio bearer between the eNB and the WTRU and/or to retain the S1 bearer between the CGW and the SGW.

The eNB inactivity timer may be sent to infinite. For example, the eNB may be configured such that the inactivity timer may not expire. This may prevent the eNB from signaling the MME that the inactivity timer has expired. This may allow the E-RAB to remain even if the WTRU and/or CGW are using Wi-Fi as the air interface to transport data to and from the WTRU. This may be used in association with the herein described example configurations of the CGW.

The CGW may be configured to use a cellular transport for at least a portion of data transported to and/or from the CGW. One or more policies within the CGW may be configured such that an amount of data (e.g., a predetermined amount of data) uses the cellular transport. For example, one or more policies may be configured such that control plane signaling (e.g., using Simple Object Access Protocol (SOAP), Open Mobile Alliance (OMA) Device Management (DM) (OMA-DM) protocol, and/or the like) between the WTRU and the CGW uses the cellular transport.

The policies may be configured such that the frequency of data transported using the cellular transport is sufficient to preclude the timer from expiring. This may be used in association with the herein described example configurations of the CGW.

The eNB inactivity timer may be allowed to expire, such that the E-RAB is removed. The CGW may be configured to employ Local-SIPTO, for example, to transport data to and/or from an application server (e.g., directly to and/or from an application server). No attempt may be made to cause the cellular network to maintain the S1 Bearer. For example, the inactivity timer may be allowed to expire and the MME and/or eNB may remove the E-RAB Bearer. In order to allow the WTRU to continue to communicate with one or more entities on the public Internet, the CGW may route packets to an application server (e.g., directly to an application server). The application server may send downlink data for the WTRU to the CGW (e.g., directly to the CGW), for example, at least partially bypassing the core network. An established session(s) between the WTRU and the application server may be lost. Subsequently established session(s) between the WTRU and one or more application servers may be routed between the CGW and the respective application server(s) (e.g., directly between the CGW and the respective application server(s)), for example via the public Internet, which may bypass the core network.

Figure 6:
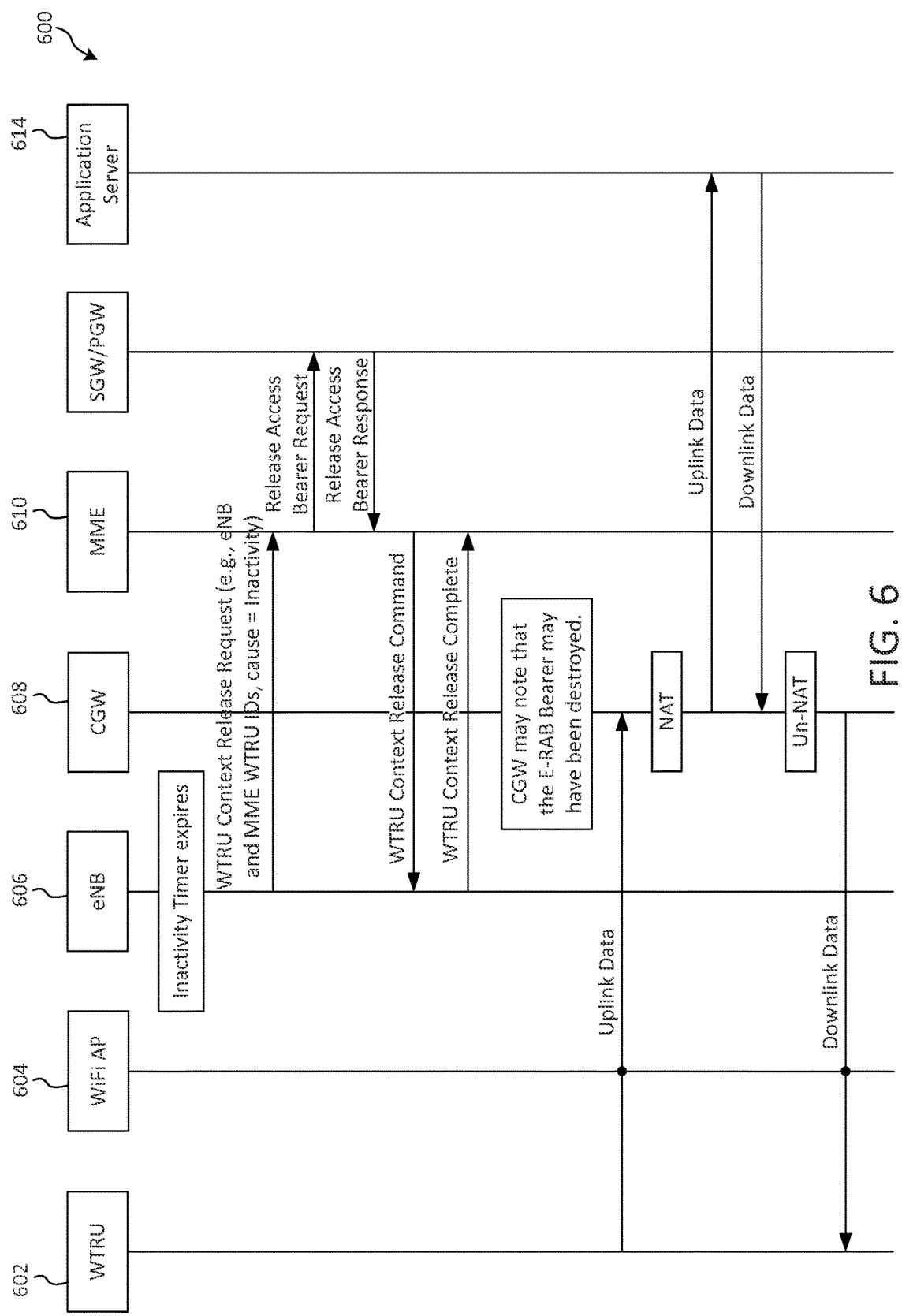
FIG. 6 depicts an example Local SIPTO message sequence chart.

FIG. 6 depicts an example Local SIPTO message sequence chart 600. A CGW 608 may perform one or more tasks as described herein. The CGW 608 may be made aware of an E-RAB Bearer removal performed by an eNB 606 and/or an MME 610. After the E-RAB is removed (e.g., torn down), the CGW 608 may begin Network Address Translation (NAT) of one or more uplink packets received from a WTRU 602, for example using a public IP address associated with the CGW 608. This may allow an application server to know where to send one or more downlink packets that may be associated with the session. Should the application server send downlink packets to the CGW 608, the CGW 608 may perform reverse NAT on the packets (e.g., un-NAT the packets). The CGW 608 may send the packets towards the WTRU 602, for example via a Wi-Fi access link 604 (e.g., Wi-Fi AP). For established sessions between the WTRU 602 and an application server 614, when the CGW 608 decides to bypass the cellular network (e.g., via a Wi-Fi AP 604), one or more of the established sessions may be lost. Subsequently established sessions between the WTRU 602 and respective application server(s) may be serviced using Local-SIPTO, for example. An example Local SIPTO message sequence chart may be depicted in FIG. 6. One or more network elements may be configured such that the S1-AP interface is routed through the CGW 608. This may be used in association with the herein described example configurations of the CGW 608.

A CGW may be configured to intervene after the expiration of an inactivity timer (e.g., after receiving an indication from an eNB that one or more bearers are to be removed). For example, the CGW may intervene such that the radio bearer associated with (e.g., between) a WTRU and an eNB and/or an S1 bearer associated with (e.g., between) the eNB and the CGW are removed, but an S1 bearer associated with (e.g., between) the CGW and a SGW remains in place. The CGW may intercept (e.g., receive) signaling (e.g., one or more messages) associated with the eNB and/or the WTRU. For example, the CGW may intercept (e.g., receive) and respond to select portions of S1-AP and/or NAS signaling from the eNB and WTRU, respectively.

Figure 7:
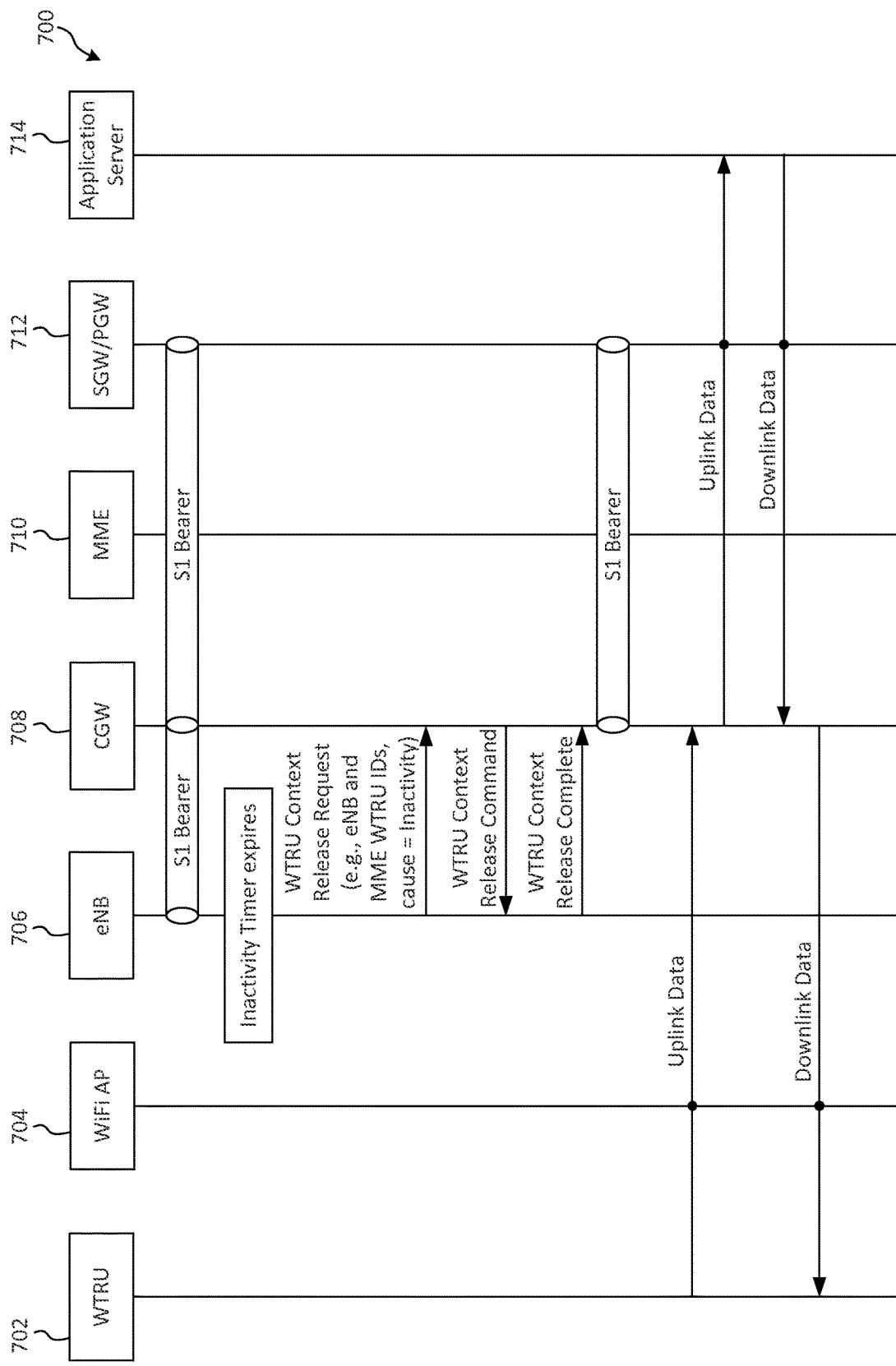
FIG. 7 depicts an example message sequence chart for S1 Bearer maintenance by standalone CGW intervention.

FIG. 7 depicts an example message sequence chart 700 for S1 Bearer maintenance via standalone CGW intervention. Upon inactivity timer expiry, an eNB 706 may issue an S1-AP signal toward an MME 710 to initiate removal of the E-RAB, for example, for a standalone CGW configuration (e.g., as depicted in FIG. 4). The E-RAB may include one or more bearers, for example, a radio bearer associated with (e.g., between) a WTRU 702 and the eNB 706, an S1 bearer associated with (e.g., between) the eNB 706 and the MME 710 (e.g., in an integrated CGW configuration), an S1 bearer associated with (e.g., between) the eNB 706 and the CGW 710 (e.g., in a standalone CGW configuration), and/or an S1 bearer associated with (e.g., between) the CGW 708 and the MME 710 (e.g., in a standalone CGW configuration).

The CGW 708 may intercept (e.g., receive) the S1-AP signal intended for the MME 710. The CGW 708 may withhold (e.g., not send) the S1-AP signal to the MME 710. The CGW 708 may mimic actions the MME 710 may perform in such a case. For example, the CGW 708 may send (e.g., issue) an S1 WTRU Context Release Command to the eNB 706. The eNB 706 may remove the radio bearer between the eNB 706 and the WTRU 702. The eNB 706 may respond to the MME 710 with a S1 WTRU Context Release Complete message. The CGW 708 may intercept (e.g., receive) the S1 WTRU Context Release Complete message intended for the MME 710. The CGW 708 may withhold (e.g., not send) the S1 WTRU Context Release Complete message intended for the MME 710. The S1 bearer associated with (e.g., between) the CGW 708 and the eNB 706 may be removed (e.g., by the eNB). The S1 bearer associated with (e.g., between) the CGW 708 and the SGW 712 may remain. Uplink data may traverse a path of WTRU-Wi-Fi AP-CGW-SGW-PGW-Application Server (e.g., application server 714). Downlink data may traverse the path in reverse.

Routing of data by the CGW 708, the WTRU 702, and/or other entity via a Wi-Fi AP 704 may be performed without the S1 bearer associated with (e.g., between) the CGW 708 and the eNB 706 and/or the radio bearer associated with (e.g., between) the eNB 706 and the WTRU 702.

Figure 8:
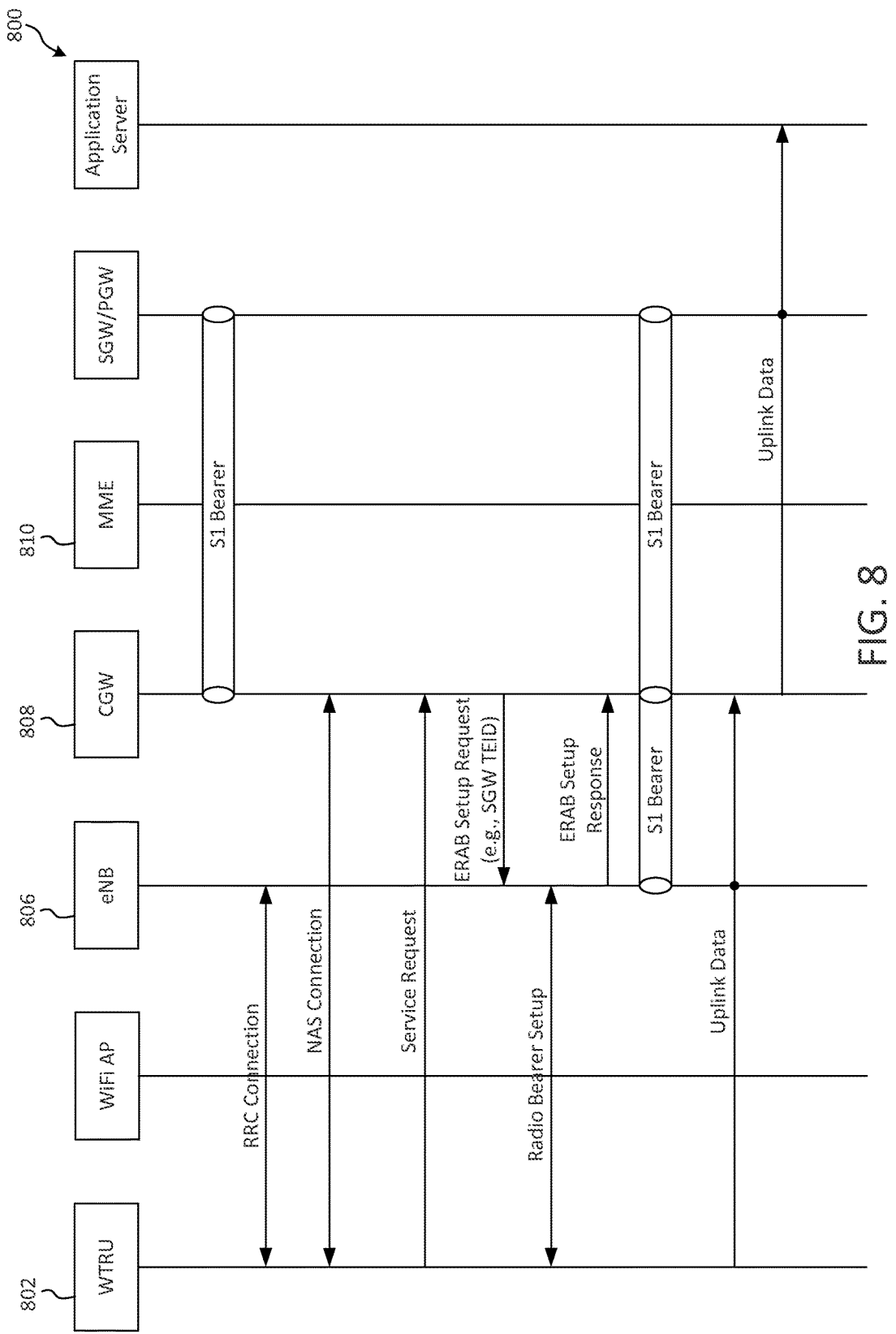
FIG. 8 depicts an example message sequence chart for EUTRAN Radio Access Bearer (E-RAB) reestablishment by standalone CGW intervention based on WTRU cellular use.
Figure 9:
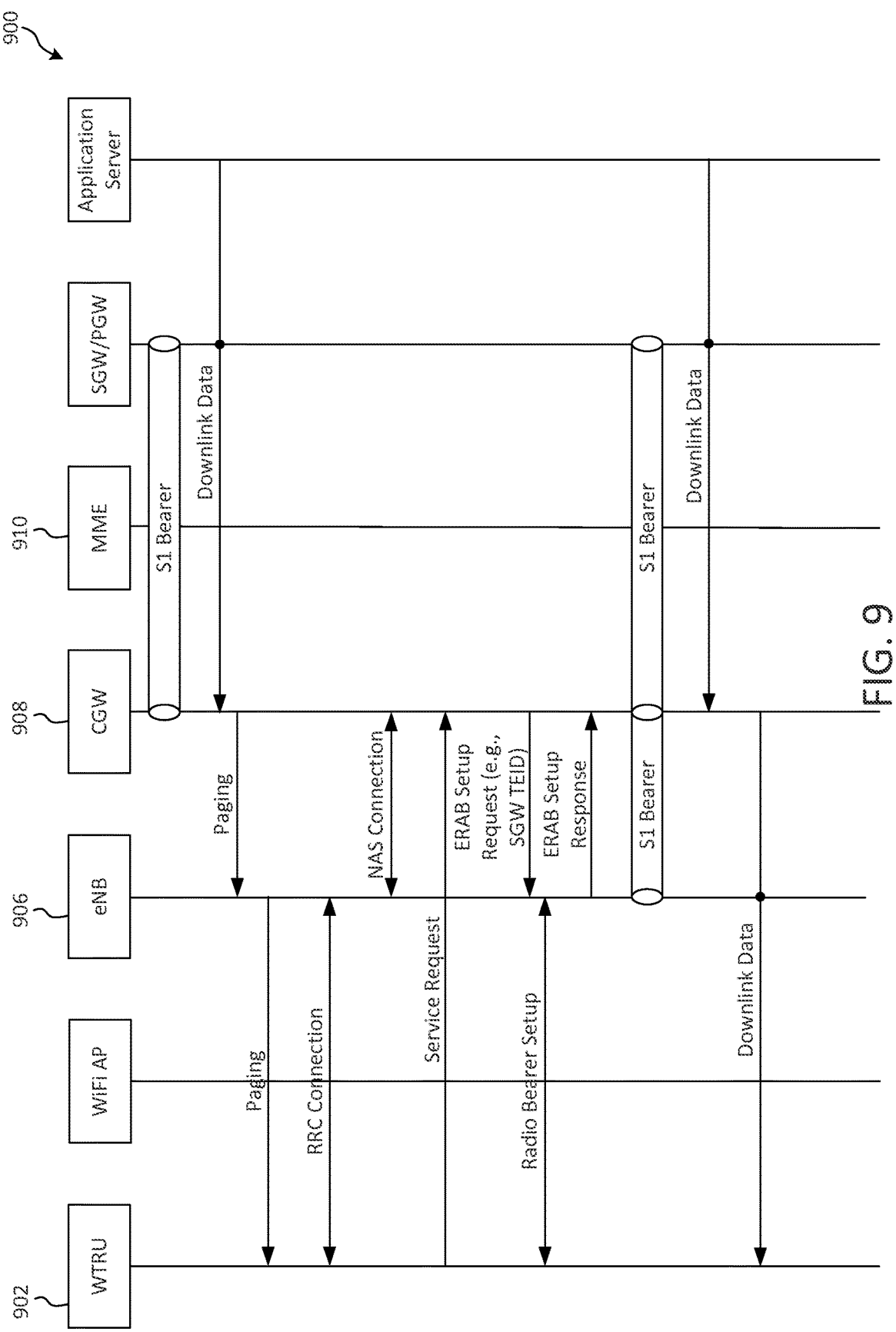
FIG. 9 depicts an example message sequence chart for EUTRAN Radio Access Bearer (E-RAB) reestablishment by standalone CGW intervention based on CGW cellular use.

FIG. 8 depicts an example message sequence chart 800 for EUTRAN Radio Access Bearer (E-RAB) reestablishment by standalone CGW intervention based on WTRU cellular use. If the WTRU 802, the CGW 808, and/or another entity decide to use cellular access for transporting data, one or more of the following may apply, for example, which may be in addition to one or more of the above implementations. If the WTRU 802 decides to use the cellular access, the E-RAB may be re-established. This may be initiated by the WTRU 802 sending a NAS Service Request towards the MME 810, for example. The CGW 808 may intercept (e.g., receive) the NAS Service Request message. The CGW 808 may withhold (e.g., not send) the NAS Service Request to the MME 810. The CGW 808 may issue one or more signals to the eNB 806 to cause the eNB 806 to reestablish the radio bearer with the WTRU 802 and/or the S1 bearer with the CGW 808. FIG. 8 depicts an example message sequence chart for E-RAB reestablishment by CGW 808 intervention based on WTRU cellular access use in accordance with the standalone CGW 808 configuration. 10097 FIG. 9 depicts an example message sequence chart 900 for EUTRAN Radio Access Bearer (E-RAB) reestablishment by standalone CGW intervention based on CGW cellular use. If the CGW 908 determines to use the cellular access, the CGW 908 may page the WTRU 902. The CGW 908 may mimic actions the MME 910 may perform. For example, the CGW 908 may send (e.g., issue) an S1 Paging message to the eNB 906. The eNB 906 may page the WTRU 902. If successful, the eNB 906 may reestablish the radio bearer associated with (e.g., between) the WTRU 902 and the eNB 906 and/or the S1 bearer associated with (e.g., between) the eNB 906 and the CGW 908. The CGW 908 may intercept (e.g., receive) NAS signaling and/or S1 signals, for example, which may be intended for the MME 910. The CGW 908 send one or more response messages to effectuate establishment of the E-RAB bearer, for example, send one or more messages to the eNB 906 and/or the WTRU 902. FIG. 9 depicts an example message sequence chart for E-RAB reestablishment by CGW intervention based on CGW cellular access use in accordance with the standalone CGW configuration. The S1 interface may be routed through the CGW 908, for example in relation to the examples depicted in FIGS. 7-9.

Figure 10A:
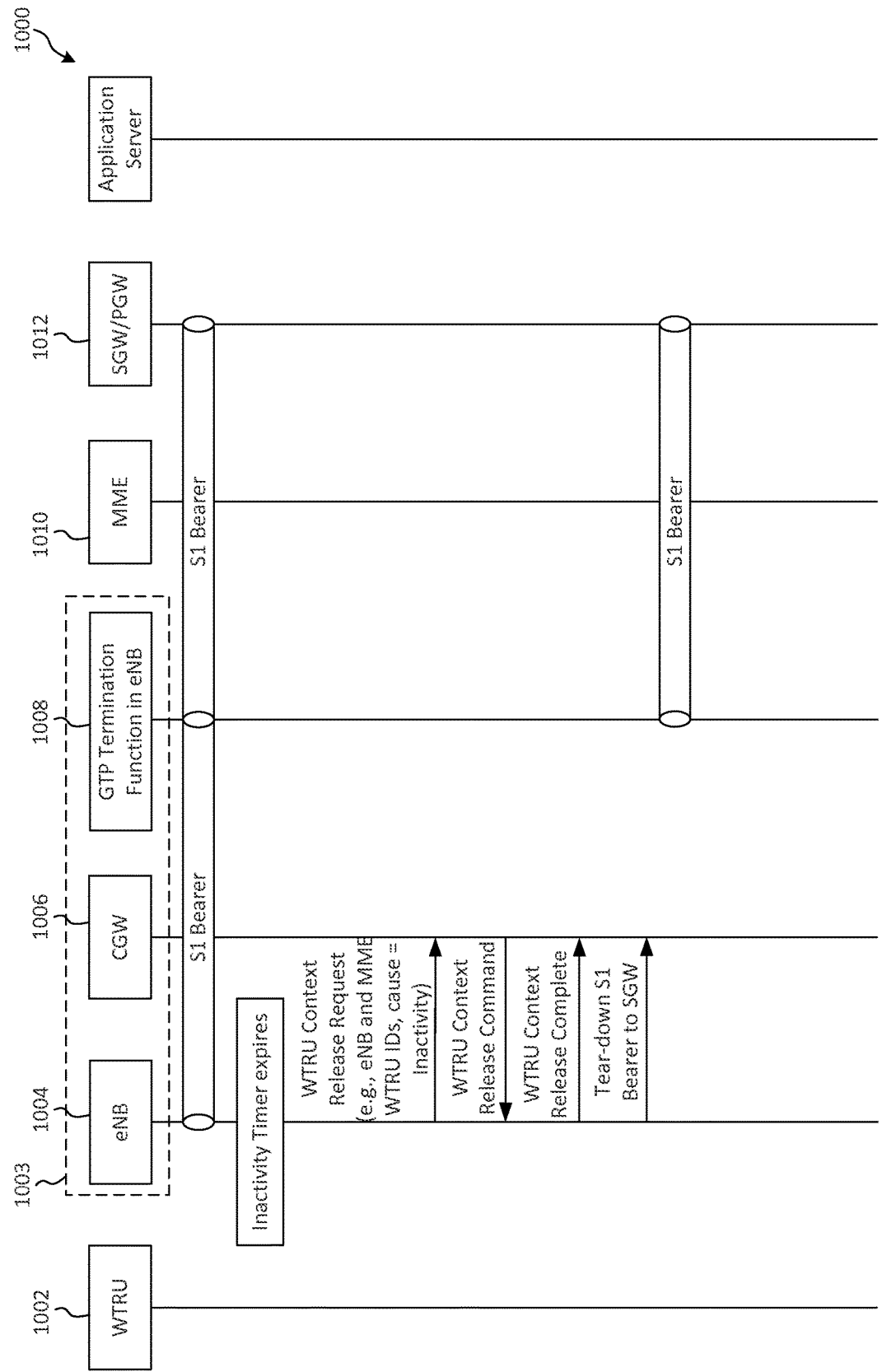
FIGS. 10A-10C depict example message sequence charts for S1 Bearer maintenance by integrated CGW intervention.
Figure 10B:
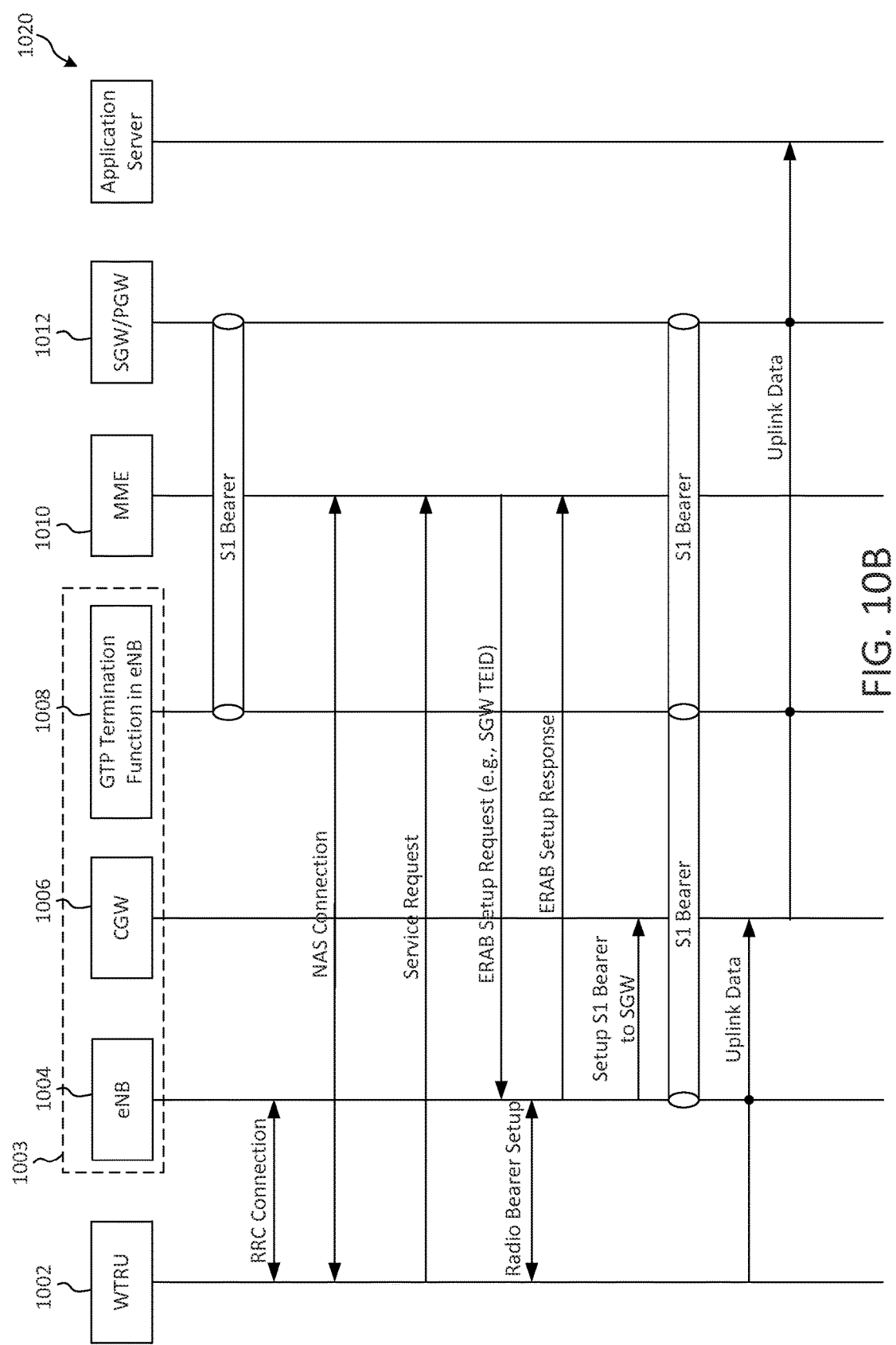
Figure 10C:
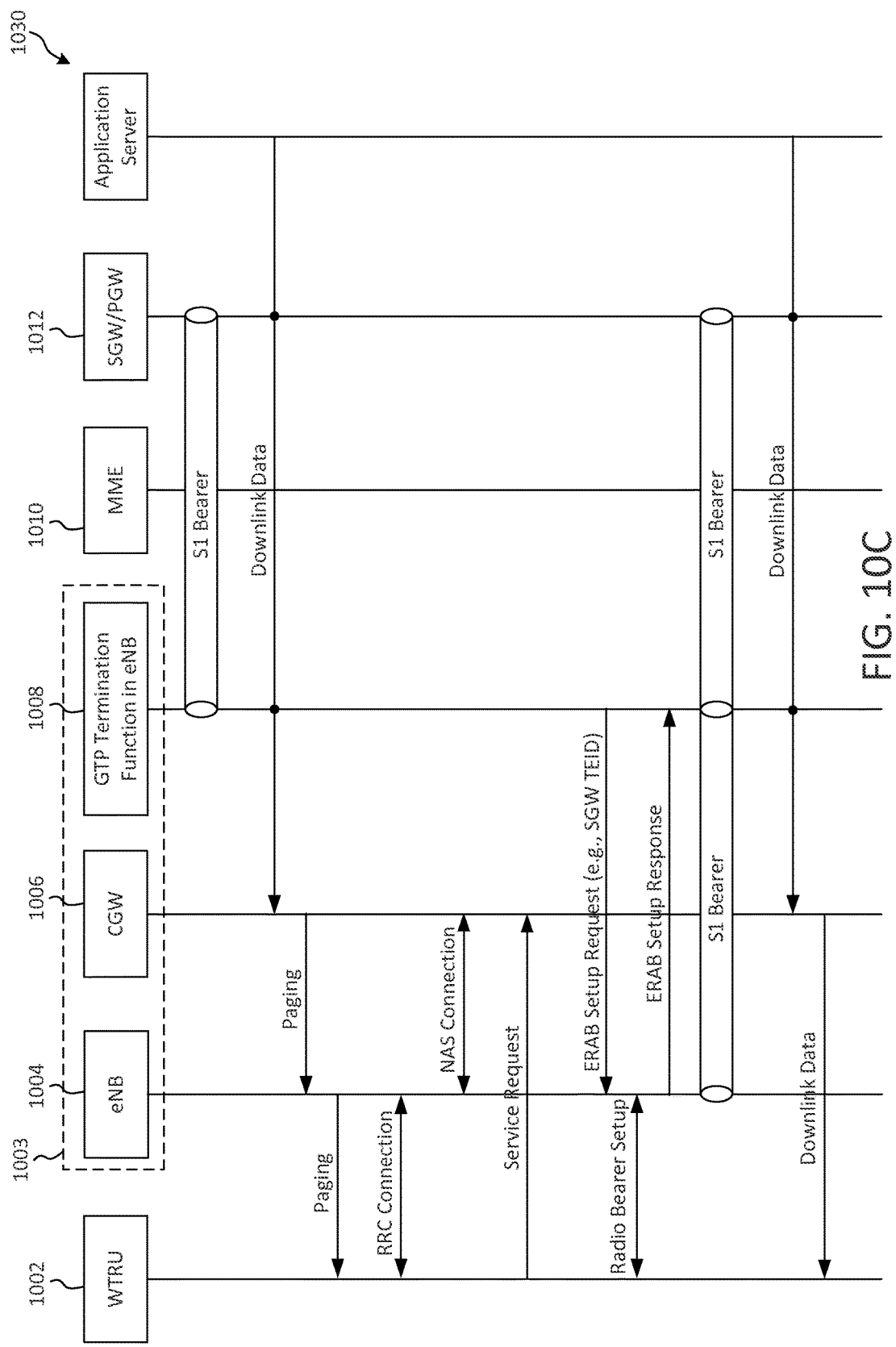

FIGS. 10A-10C depict example message sequence charts 1000, 1020, 1030 for S1 Bearer maintenance by integrated CGW intervention. For an integrated CGW configuration (e.g., as depicted in FIG. 5), one or more of the following may apply, which may be in addition to one or more of the above implementations. An integrated CGW configuration may refer to a configuration where an eNB 1003 includes a CGW 1006 (e.g., the CGW is incorporated within the eNB, for example, as shown in FIG. 5). There may be an S1 bearer (e.g., a single S1 Bearer) associated with (e.g., between) the eNB 1003 and an MME 1010 (e.g., between the sub-eNB 1004 and the MME 1010). Because the CGW 1006 may be located between a sub-eNB 1004 and a GTP termination function 1008 of the eNB 1003, there may be one or more signals between these entities that may be intercepted (e.g., received) by the integrated CGW 1006. These signals may be communicated between entities and/or functions within the eNB 1003. The CGW 1006 may intercept (e.g., receive) one or more of the signals between the entities and/or functions of the eNB 1003, for example, regardless of the signaling used. In order to maintain the S1 bearer between the GTP termination 1008 and a SGW 1012 when the inactivity timer expires, the CGW 1006 may intercept (e.g., receive) one or more of the signals from the sub-eNB 1004 to the GTP termination function 1008. The CGW 1006 may send the proper response signals to the sub-eNB 1004. The CGW 1006 may withhold (e.g., not send) the one or more intercepted signals that were intended for the MME 1010. FIGS. 10A-10C depict example message sequence charts for S1 Bearer maintenance by CGW intervention in accordance with the integrated CGW configuration.

The MME and/or the eNB may be configured to be aware of the CGW, which for example may allow the MME and/or the eNB to remove the radio bearer associated with (e.g., between) the sub-eNB and the WTRU and/or to retain the S1 bearer associated with (e.g., between) the GTP termination and the SGW.

For a standalone CGW configuration (e.g., as depicted in FIG. 4), the MME may be configured such that it may be made aware of a presence of the CGW. The S1 interface between the eNB and the MME may be routed through the CGW. Example message sequence charts for this process are depicted in FIGS. 11A-11D.

Figure 11A:
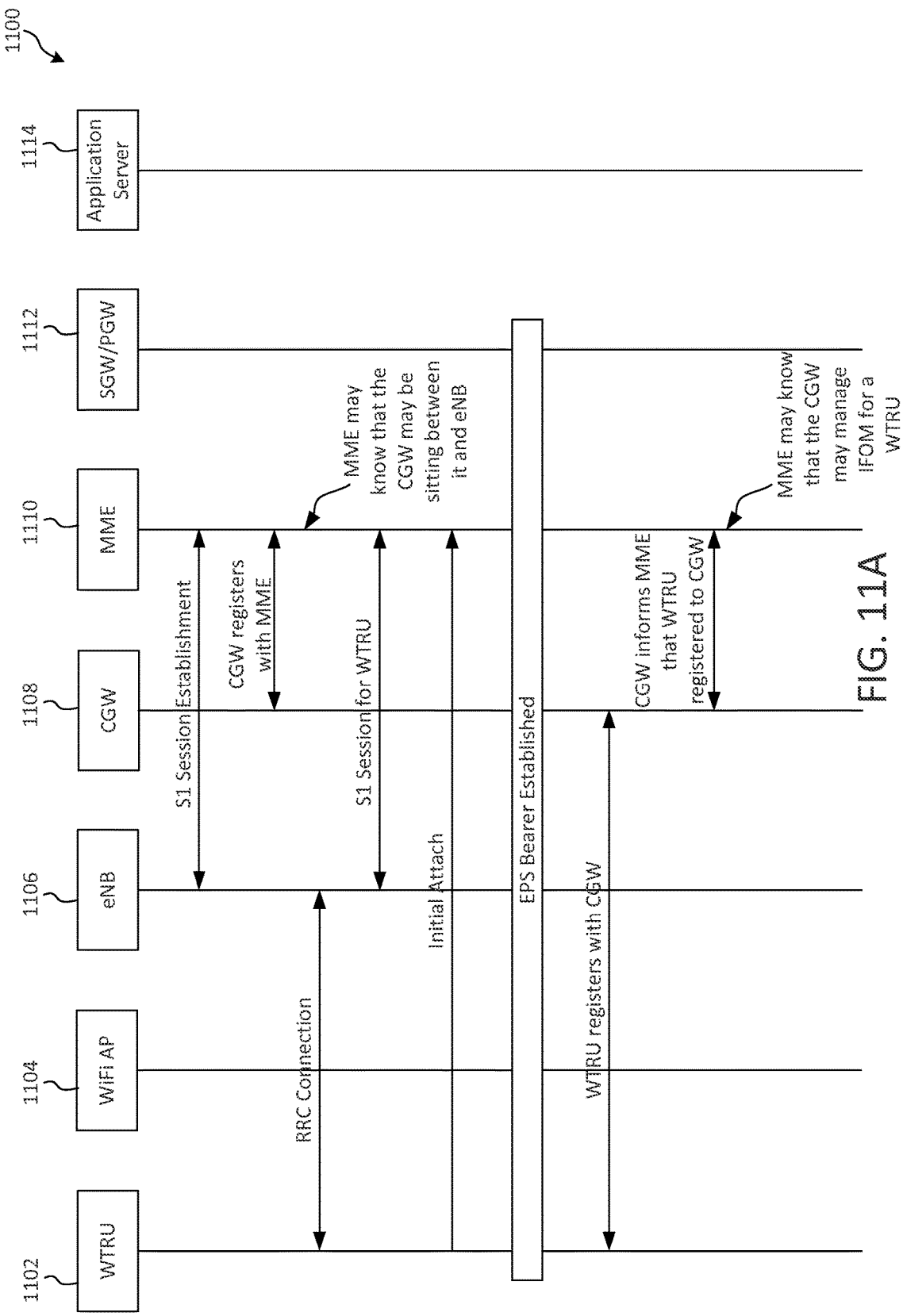
FIGS. 11A-11D depict example message sequence charts for configuring a mobility management gateway (MME) and/or an eNB to support a standalone CGW.

FIG. 11A depicts an example message sequence chart 1100 for configuring an MME 1110 and/or an eNB 1106 to support a standalone CGW 1108. An eNB 1106 and/or an MME 1110 may establish an S1 session that may pass through the CGW 1108, for example, as depicted in FIG. 11A. The CGW 1108 may be aware of the S1 session establishment. The CGW 1108 may register with the MME 1110. The CGW 1108 may inform the MME 1110 that it is situated between the eNB 1106 and the MME 1110. A WTRU 1102 may connect to the network and/or the CGW 1108, for example, once the CGW 1108 registers its presence to the MME 1110 and/or informs the MME 1110 that it is situated on the MME-eNB interface. Once the WTRU 1102 has attached to the network, the WTRU 1102 may register its presence with the CGW 1108, for example using control plane signaling. This registration may trigger the CGW 108 to inform the MME 1110 (e.g., via signaling) that the CGW 1108 may manage IP Flow Mobility (IFOM) for the WTRU 1102. The CGW 1108 may inform the MME 1110 (e.g., via signaling) that the CGW 1108 may use the S1 bearer, for example, even if the eNB 1106 attempts to remove the S1 bearer, for example due to inactivity.

The interface between the CGW 1106 and the MME 1110 may be secured, for example using IP Sec. The transport layer used for the CGW-MME interface may be Stream Control Transmission Protocol (SCTP), TCP and UDP, and/or another suitable protocol. The application layer may use a suitable protocol.

Figure 11B:
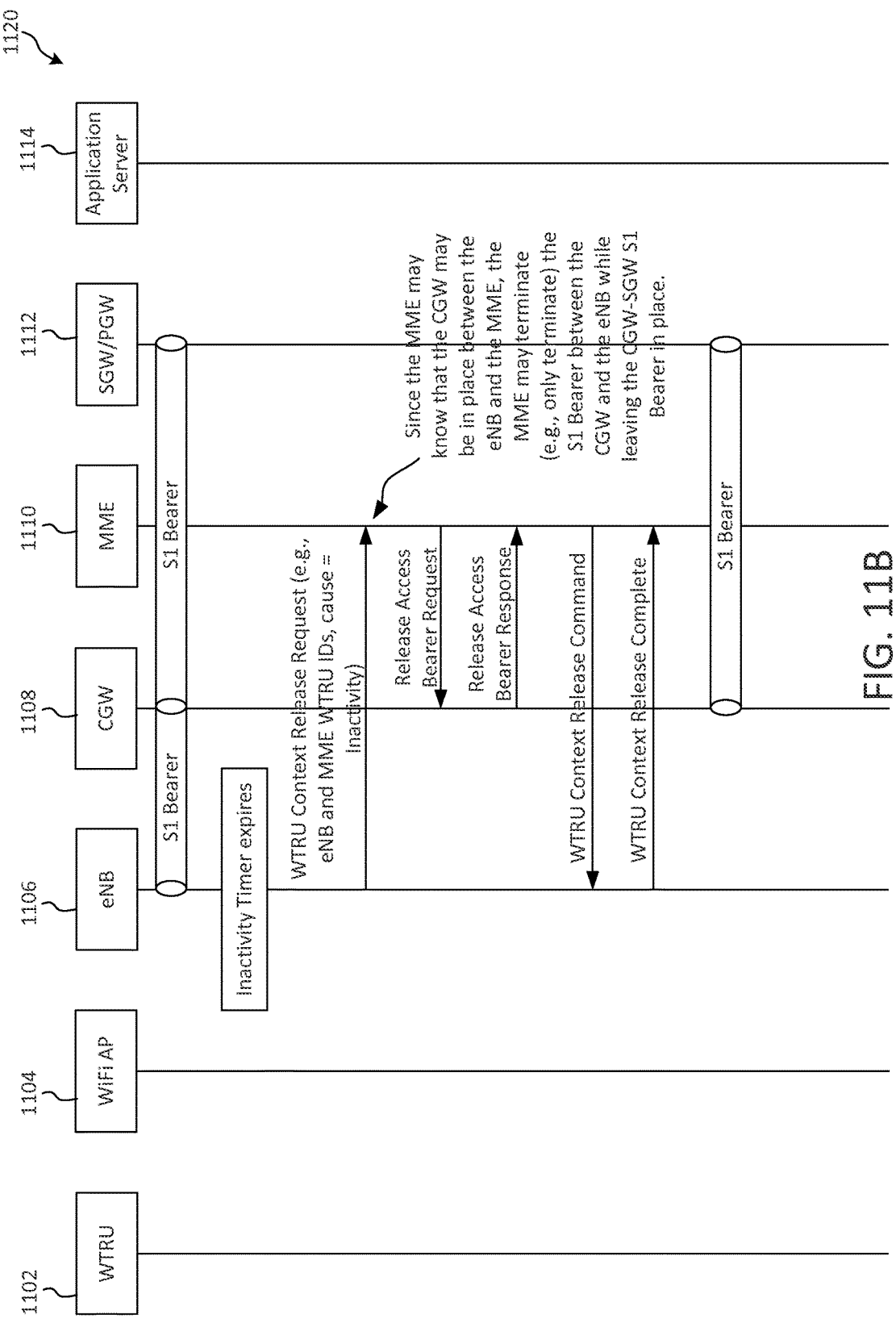

FIG. 11B depicts an example message sequence chart 1120 for configuring an MME and/or an eNB to support a standalone CGW. An S1 bearer (e.g., a first S1 bearer) associated with (e.g., between) the CGW 1108 and the eNB 1106 may be established and/or an S1 bearer (e.g., a second S1 bearer) associated with (e.g., between) the CGW 1108 and the SGW 1112 may be established, for example, as described in relation to FIG. 11A.

The inactivity timer in the eNB 1106 may expire. For example, the WTRU may not have engaged in data activities or may have engaged in data activities using a Wi-Fi AP 1104 connection such that the inactivity timer in the eNB 1106 may expire. The expiration of the inactivity timer in the eNB 1106 may cause the eNB 1106 to send (e.g., issue) an S1 WTRU Context Release Request message to the MME 1110. The MME 1110 may have knowledge of the presence of the CGW 1108. The MME 1110 may send a GTP Release Access Bearer Request message to the CGW 1108. The CGW 1108 may respond to the GTP Release Access Bearer Request message by sending a GTP Release Access Bearer Response message to the MME 1110. The CGW 1108 may not send the GTP Release Access Bearer Request message to the eNB 1106. The MME 1110 may send (e.g., issue) a S1 WTRU Content Release Command to the eNB 1106. The S1 WTRU Content Release Command may be associated with the radio bearer and/or the S1 bearer associated with (e.g., between) the eNB and CGW. The eNB 1106 may receive the S1 WTRU Content Release Command. The eNB 1106 may tear down the radio bearer, for example, in response to receiving the S1 WTRU Content Release Command. The eNB 1106 may send an S1 WTRU Context Release Complete message to the MME 1110 in response. At this point, the S1 bearer associated with (e.g., between) the CGW 1108 and the eNB 1106 and/or the radio bearer associated with (e.g., between) the eNB 1106 and the WTRU 1102 may be removed. The S1 bearer associated with (e.g., between) the CGW 1108 and the SGW 1112 may remain. Because the S1 bearer associated with (e.g., between) the CGW 1108 and the SGW 1112 may remain, the WTRU 1102 may use a Wi-Fi connection 1104 (e.g., a Wi-Fi AP) to communicate with an application server 1114, for example, bypassing the radio bearer associated with (e.g., between) the WTRU 1102 and the eNB 1106.

Figure 11C:
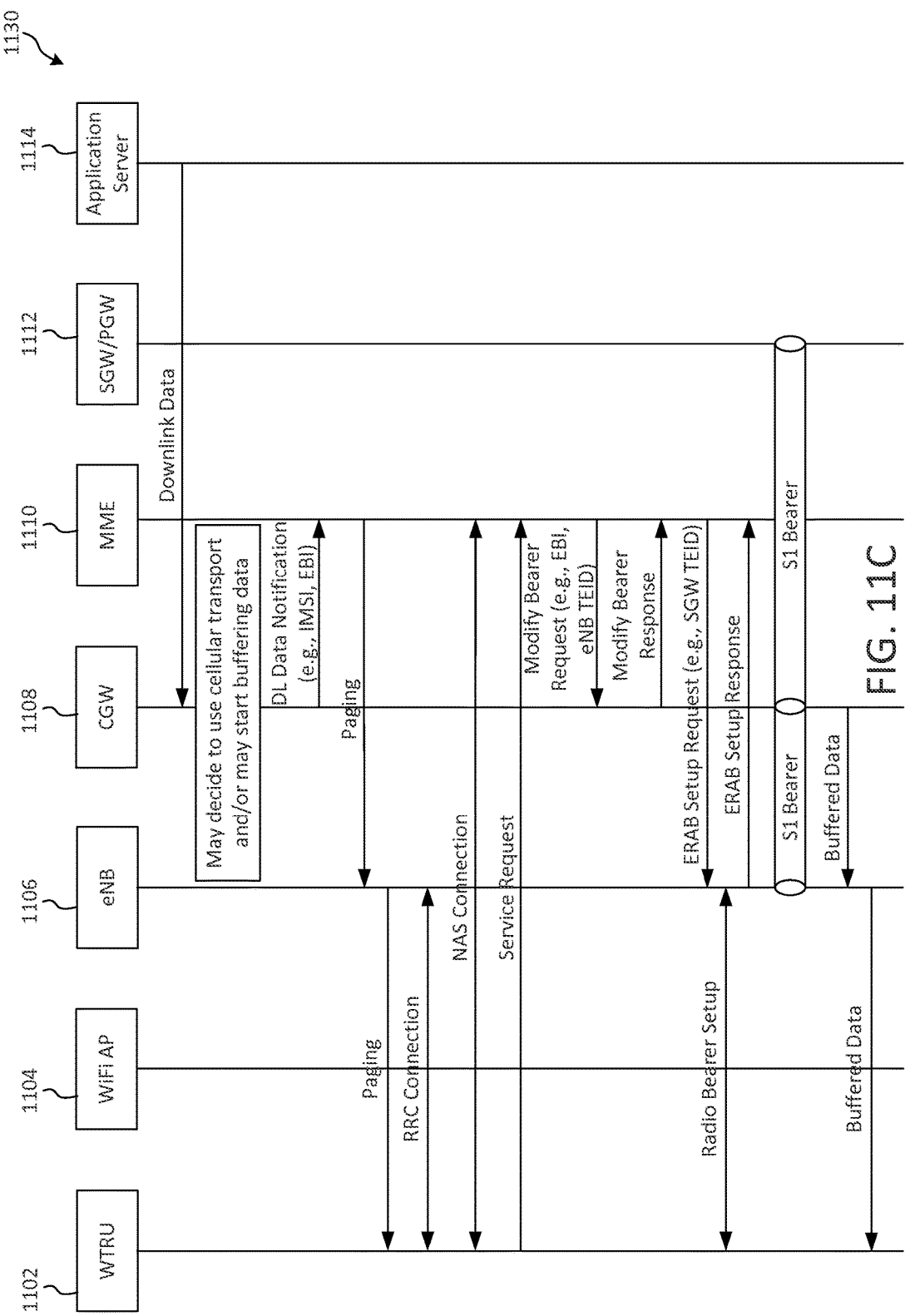

FIG. 11C depicts an example message sequence chart 1130 for configuring an MME and/or an eNB to support a standalone CGW. The inactivity timer may have expired. The S1 bearer associated with (e.g., between) the CGW 1108 and the eNB 1106 and/or the radio bearer associated with (e.g., between) the eNB 1106 and the WTRU 1102 may have been removed, for example, as described in relation to FIG. 11B. The application server 1114 may send (e.g., push) data toward the WTRU 1102. The data may be received by the CGW 1108, for example, via an S1 bearer associated with the CGW 1108 and the SGW 1112. The CGW 1108 may determine to send (e.g., route) the data to the WTRU 1102 using the cellular transport. Upon making this decision, the CGW 1108 may send (e.g., issue) a GTP Downlink Data Notification towards the MME 1110. The GTP Downlink Data Notification may indicate a desire for a connection to be established with the WTRU 1102, for example, via the cellular transport (e.g., the radio bearer).

Upon receiving the GTP Downlink Data Notification message, the MME 1110 may send a paging message towards the WTRU 1102 (e.g., via the eNB 1106). Upon receiving the paging message, the WTRU 1102 may respond to the page issued by the eNB 1106. An RRC connection may be established between the WTRU 1102 and the eNB 1106. A NAS connection may be established between the WTRU 102 and the MME 1110. The WTRU 1102 may issue a NAS Service Request message that may indicate a desire for a data connection. The MME 1110 may issue a GTP Modify Bearer Request message and/or an S1 ERAB Setup Request message, for example to facilitate setup of an S1 bearer associated with (e.g., between) the CGW 1108 and the eNB 1106.

As a result of the ERAB Setup Request message, the eNB 1106 may establish a radio bearer with the WTRU 1102. With the S1 bearer associated with (e.g., between) the CGW 1108 and the eNB 1106 in place, the CGW 1108 may send (e.g., forward) downlink data to the eNB 1106. The eNB 1106 may receive the downlink data. The eNB 1106 may send (e.g., route) the downlink data to the WTRU 1102, for example using the radio bearer. The WTRU 1102 may receive the downlink data. The WTRU 1102 may send uplink data to the eNB 1106, for example over the radio bearer. The eNB 1106 may send (e.g., route) the uplink data to the CGW 1108, for example via the S1 bearer associated with (e.g., between) the eNB 1106 and the CGW 1108. The CGW 1108 may send (e.g., route) the uplink data toward the SGW 1112, for example via the S1 bearer associated with (e.g., between) the CGW 1108 and the SGW 1112. The SGW 1112 may send (e.g., route) the uplink data towards the PGW and to the application server 1114.

Figure 11D:
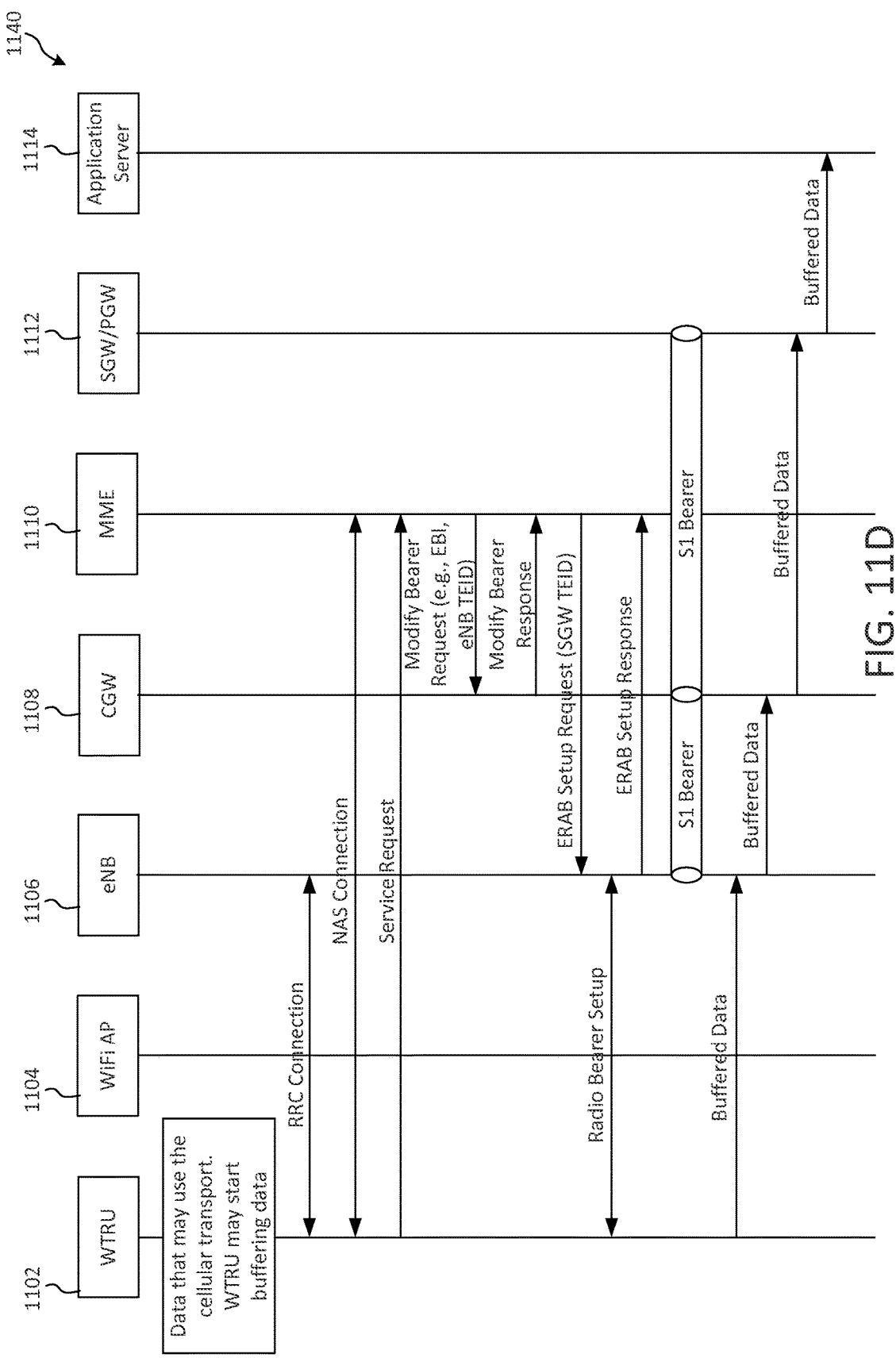

FIG. 11D depicts an example message sequence chart 1140 for configuring an MME and/or an eNB to support a standalone CGW. The inactivity timer may have expired. The S1 bearer (e.g., the first S1 Bearer) associated with (e.g., between) the CGW 1108 and the eNB 1106 and/or the radio bearer associated with (e.g., between) the eNB 1106 and the WTRU 1102 may have been removed, for example, as described in relation to FIG. 1B. The WTRU 1102 may have data it desires to send to an application server via the cellular transport. The WTRU 1102 may establish an RRC connection with the eNB 1106. The WTRU 1102 may establish a NAS connection with the MME 1110. With one or both of the RRC connection and/or NAS connection in place, the WTRU 1102 may send (e.g., issue) a service request to the MME 1110. The MME 1110 may have knowledge that the WTRU 1102 is connected to the eNB 1106 and/or that a CGW 1108 is in place. The MME 1110 may send (e.g., issue) a GTP Modify Bearer Request to the CGW 1108. The MME 1110 may send (e.g., issue) an S1 ERAB Setup Request message to the eNB 1106.

This signaling (e.g., the GTP Modify Bearer Request and/or the S1 ERAB Setup Request message) may result in the establishment of a radio bearer associated with (e.g., between) the WTRU 1102 and the eNB 1106 and/or an S1 bearer associated with (e.g., between) the CGW 1108 and the eNB 1106. With the E-RAB established, the WTRU 1102 may send (e.g., push) data toward the application server 1114. The data may traverse the radio bearer to reach the eNB 1106. The data may traverse an S1 bearer (e.g., the first S1 bearer) from the eNB 1106 to the CGW 1108. From the CGW 1108, the data may traverse an S1 bearer (e.g., the second S1 bearer) between the CGW 1108 and the SGW 1112. From the SGW 1112, the data may be sent to the PGW and/or may be sent to the public Internet towards the application server 1114. Downlink data may traverse this path in the opposite direction.

For an integrated CGW configuration (e.g., as depicted in FIG. 5), the MME and/or the eNB may be configured such that they may be made aware of the presence of the CGW. Example message sequence charts for this process may be depicted in FIGS. 12A-12D.

Figure 12A:
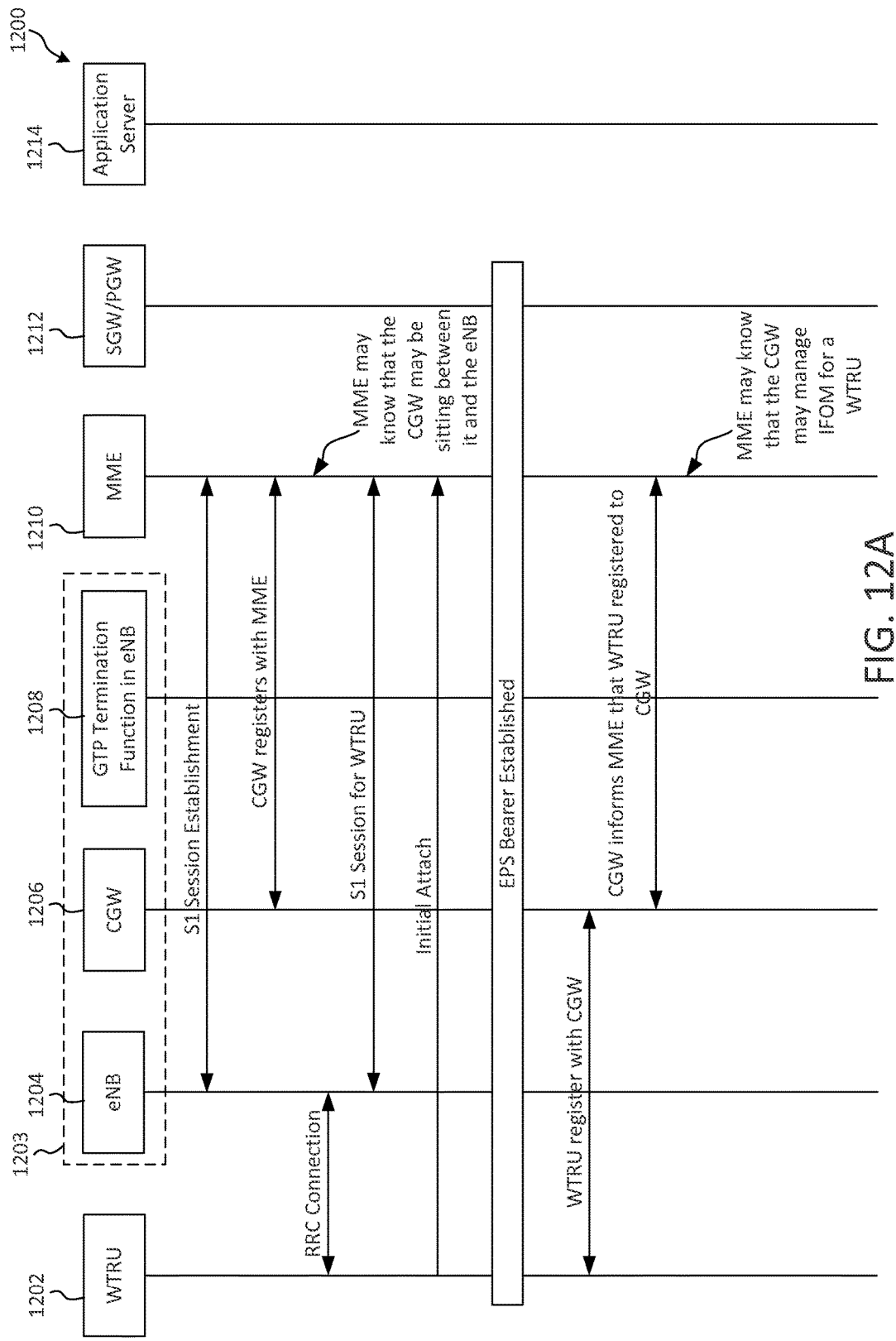
FIGS. 12A-12D depict example message sequence charts for configuring a mobility management gateway (MME) and an eNB to support an integrated CGW.

FIG. 12A depicts an example message sequence chart 1200 for configuring an MME 1210 and/or an eNB 1203 to support an integrated CGW 1206. A sub-eNB 1204 and/or the MME 1210 may establish an S1 Session that may pass through the CGW 1206, for example, as depicted in FIG. 12A. The CGW 1206 may be aware of the S1 Session establishment. The CGW 1206 may register with the MME 1210. The CGW 1206 may inform the MME 1210 that it is situated between the sub-eNB 1204 and MME 1210.

A WTRU 1202 may connect to the network, for example, after the CGW 1206 registers its presence to the MME 1210 and/or informs the MME 1210 that it is situated on the MME-eNB interface. Once the WTRU 1202 has attached to the network, the WTRU 1202 may register its presence with the CGW 1206, for example using control plane signaling. The registration of the WTRU 1202 may trigger the CGW 1206 to inform the MME 1210 that the CGW 1206 may manage IFOM for the WTRU 1202 and/or may use the S1 bearer (e.g., the S1 bearer associated with the CGW 1206 and the MME 1210), for example, even if the eNB 1203 attempts to remove the S1 bearer, for example due to inactivity.

The interface between the integrated CGW 1206 and the MME 1210 may be secured, for example using IP Sec. The transport layer used for the CGW-MME interface may be SCTP, TCP and UDP, and/or another suitable protocol. The application layer may use a suitable protocol.

Figure 12B:
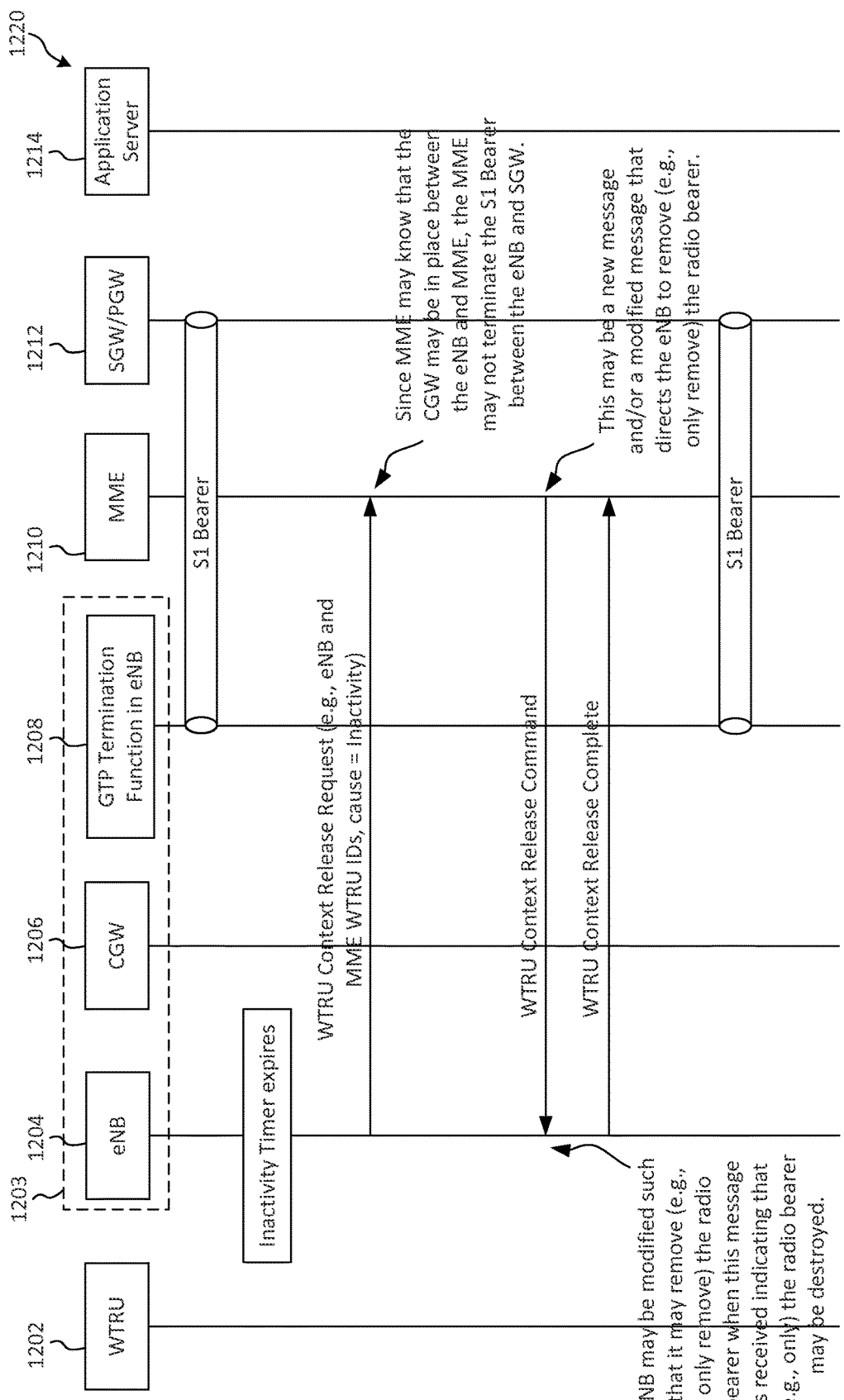

FIG. 12B depicts an example message sequence chart 1220 for configuring an MME 1210 and/or an eNB 1203 to support an integrated CGW 1206. An S1 Bearer may be established between the integrated CGW 1206 and the SGW 1212, for example, as described with reference to FIG. 12A. The WTRU may not have engaged in data activities or may have engaged in data activities using a Wi-Fi AP connection (e.g., not shown), such that the inactivity timer in the eNB 1203 may expire. Expiration of the inactivity timer may cause the eNB 1203 to issue an S1 WTRU Context Release Request message. The MME 1210, which may have knowledge of the presence of the integrated CGW 1206, may not send a GTP Release Access Bearer Request message to the CGW 1206. The S1 bearer associated with (e.g., between) the integrated CGW 1206 and the SGW 1212 may remain in place, for example, so as to allow the CGW 1206 to continue to send (e.g., route) data to the WTRU 1202, for example via a Wi-Fi interface (e.g., Wi-Fi AP).

The MME 1210 may issue a S1 WTRU Content Release Command message (e.g., modified S1 WTRU Content Release Command message) and/or another suitable message. The message may instruct the eNB 1203 to tear down to the radio bearer associated with (e.g., between) the sub-eNB 1204 and the WTRU 1202. The eNB 1203 may not tear down the S1 bearer associated with (e.g., between) the GTP termination 1208 of the eNB 1203 and the SGW 1212. The sub-eNB 1204 may send an S1 WTRU Context Release Complete message and/or another suitable message, for example, upon teardown of the radio bearer. The radio bearer associated with (e.g., between) the sub-eNB 1204 and the WTRU 1202 may be removed. The S1 bearer may remain. The S1 bearer may be used to service a Wi-Fi connection (e.g., via a Wi-Fi AP) between the WTRU 1202 and the CGW 1206, for example, which may facilitate a communication session between an application server 1214 and the WTRU 1202.

Figure 12C:
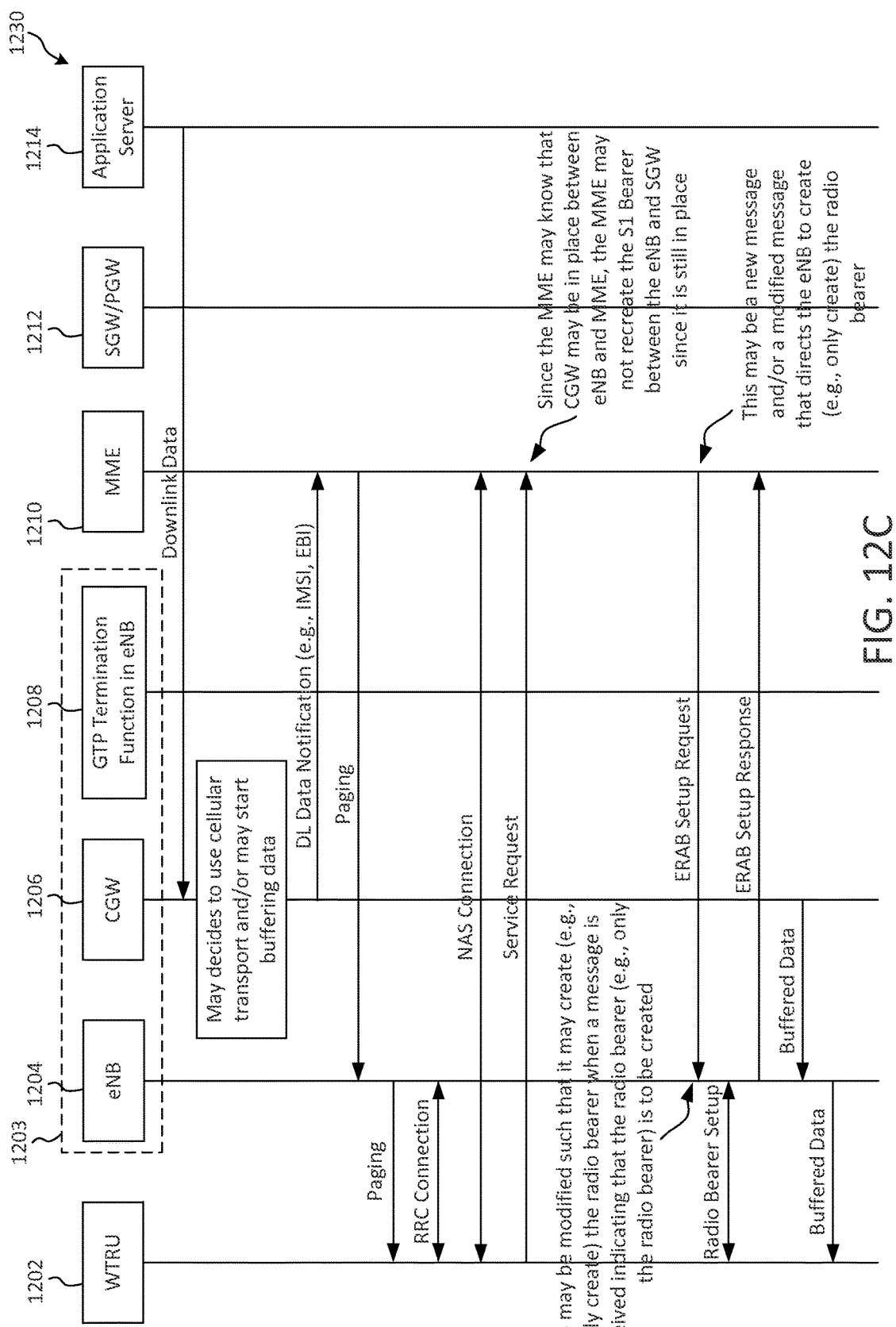

FIG. 12C depicts an example message sequence chart 1230 for configuring an MME 1210 and/or an eNB 1203 to support an integrated CGW 1206. The inactivity timer may have expired. The S1 Bearer associated with (e.g., between) the GTP termination 1208 and SGW 1212 may remain and/or the radio bearer associated with (e.g., between) the sub-eNB 1204 and the WTRU 1202 may have been removed, for example, as described with reference to FIG. 12B. The application server 1214 may send (e.g., push) data toward the WTRU 1202. The data may reach the CGW 1206. The CGW 1206 may decide to send (e.g., route) the data to the WTRU 1202 using the cellular transport. Upon making this decision, the CGW 1206 may send (e.g., issue) a GTP Downlink Data Notification message to the MME 1210. The GTP Downlink Data Notification message may indicate a desire for an establishment of a connection between the WTRU 1202 and the CGW 1206.

Upon receiving the GTP Downlink Data Notification message, the MME 1210 may page the WTRU 1202. The WTRU 1202 may respond to the page sent (e.g., routed) by the eNB 1203 (e.g., the page may be routed to the WTRU 1202 via the eNB 1203). The WTRU 1202 may establish an RRC connection with the eNB 1203. The WTRU 1202 may establish a NAS connection with the MME 1210. The WTRU 1202 may issue a NAS Service Request message. The NAS Service Request message may indicate a desire for a data connection to be established, for example, between the WTRU 1202 and the MME 1210. The MME 1210 may send (e.g., issue) an S1 ERAB Setup Request message and/or another suitable message, for example, towards the eNB 1203.

The eNB 1203 may establish a radio bearer with the WTRU 1202, for example, as a result of receiving the ERAB Setup Request message. With the radio bearer established, the CGW 1206 may send (e.g., forward) downlink data to the WTRU 1202 via the eNB 1203 (e.g., as opposed to via a Wi-Fi AP). The eNB 1203 may receive the downlink data. The eNB 1203 may send (e.g., deliver) the downlink data to the WTRU 1202, for example using the radio bearer. The WTRU 1202 may send uplink data to the sub-eNB 1204, for example over the radio bearer. The sub-eNB 1204 may send (e.g., deliver) the uplink data to the CGW 1206 (e.g., via an S1 bearer). The CGW 1206 may send (e.g., push) the uplink data to the GTP entity 1208 within the eNB 1203. The GTP entity 1208 may send (e.g., push) the uplink data to the SGW 1212, for example via the S1 bearer. The SGW 1212 may send the uplink data towards the PGW. The PGW may send the uplink data towards the application server 1214.

Figure 12D:
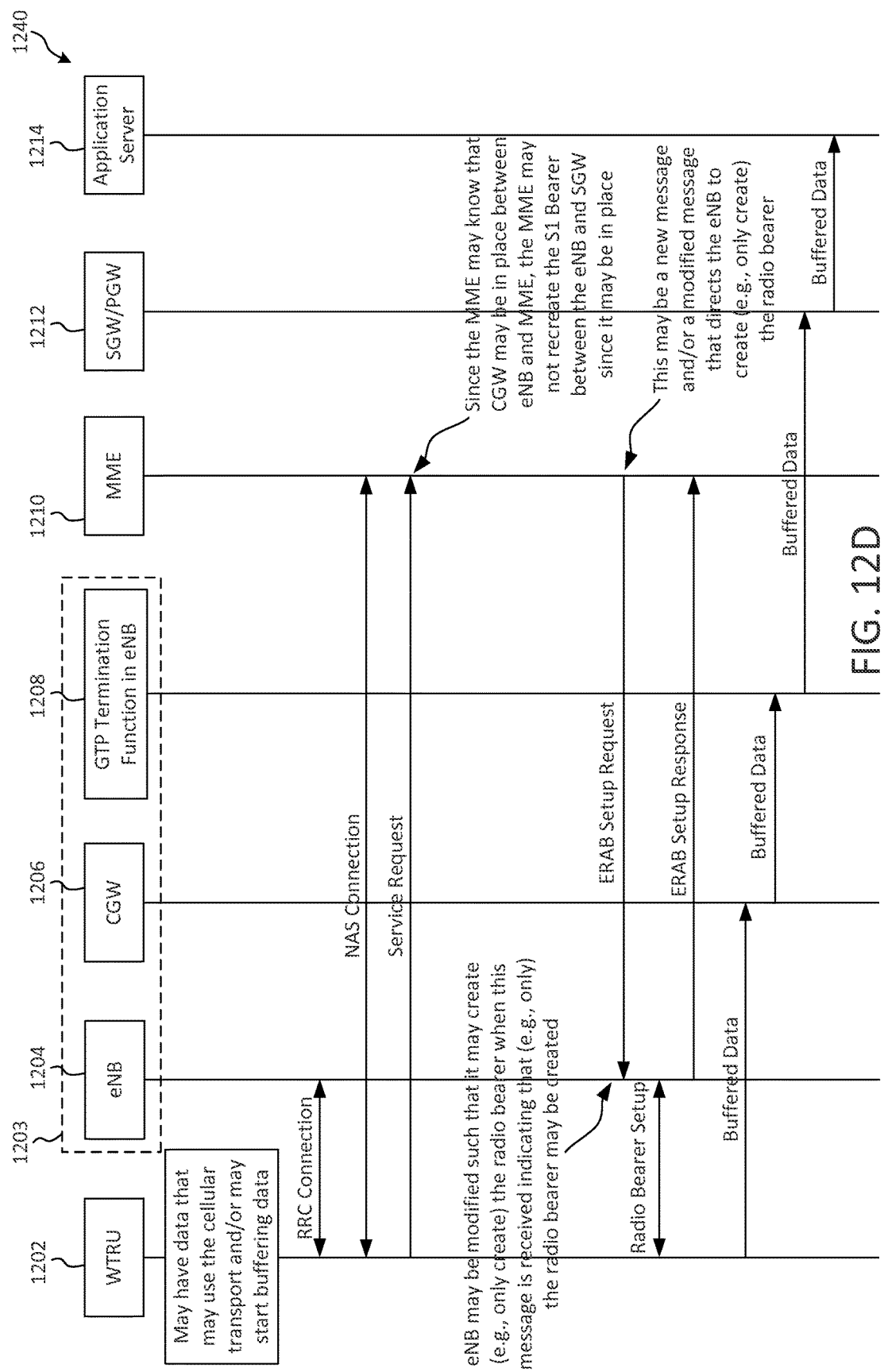

FIG. 12D depicts an example message sequence chart 1240 for configuring an MME 1210 and/or an eNB 1203 to support an integrated CGW 1206. The inactivity timer may have expired. The radio bearer associated with (e.g., between) the sub-eNB 1204 and the WTRU 1202 may have been removed, for example, as described with reference to FIG. 12B. The WTRU 1202 may have data it desires to send (e.g., push) to the application server via the cellular transport. The WTRU 1202 may establish an RRC connection with the eNB 1203. The WTRU 1202 may establish a NAS connection with the MME 1210. With one or both of these connections in place, the WTRU 1202 may send (e.g., issue) a service request to the MME 1210. The MME 1210 may have knowledge that the WTRU 1202 is connected to the eNB 1203 and/or that the eNB 1203 has a CGW 1206 in place. The MME 1210 may send (e.g., issue) an S1 ERAB Setup Request message to the eNB 1203. The S1 ERAB Setup Request message may indicate a desire to reestablish the radio bearer. This may be accomplished by implementing a field in a message that indicates that indicates reinstantiation of the radio bearer and/or via the use of another suitable message.

Upon receipt of the S1 ERAB Setup Request message, the eNB 1203 may establish a radio bearer associated with (e.g., between) the sub-eNB 1204 and the WTRU 1202. With the E-RAB established, the WTRU 1202 may send data to the application server 1214, for example, via the radio bearer. The data may traverse the radio bearer and may reach the integrated CGW 1206. The CGW 1206 may send (e.g., push) the data towards the GTP entity 1208 within the eNB 1203. The GTP entity 1208 may format the data. The GTP entity 1208 may send (e.g., push) the data towards the SGW 1212, for example via the S1 bearer associated with (e.g., between) the GTP termination 1208 and the SGW 1212. The SGW 1212 may send (e.g., push) the data towards the PGW. The PGW may send the data onto the public Internet to the application server 1214. Downlink data may traverse this path in the opposite direction.

Figure 13:
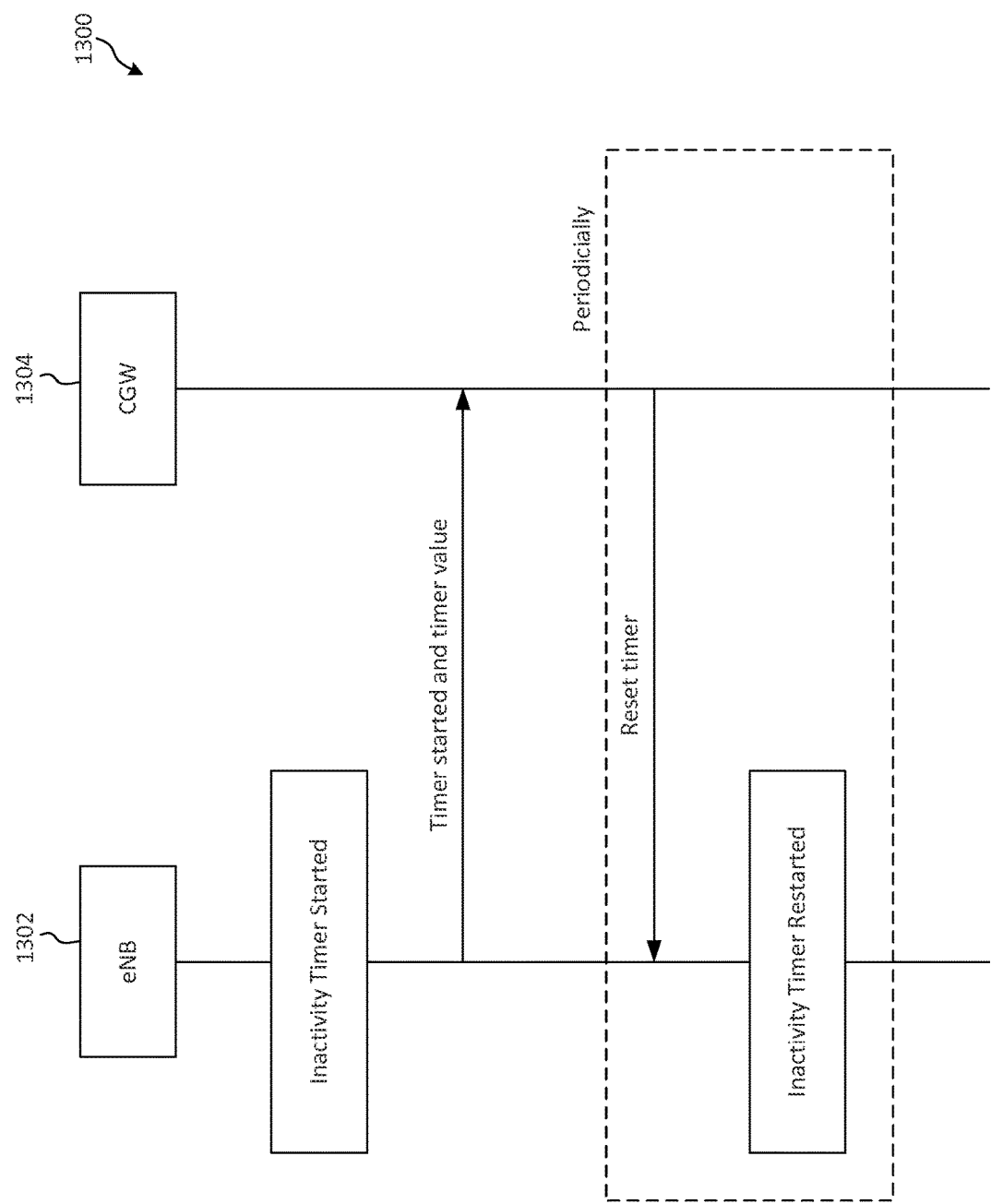
FIG. 13 depicts an example message sequence charts for inactivity timer maintenance.

FIG. 13 depicts an example message sequence chart 1300 for inactivity timer maintenance. The message sequence chart of FIG. 13 may be applicable to an integrated CGW and/or a standalone CGW. An eNB may perform the message sequence of FIG. 13. An eNB 1302 may begin an inactivity timer for a radio bearer associated with a WTRU. When the eNB 1302 begins the inactivity timer, the eNB 1302 may send a message to a CGW 1304. The message may indicate that the timer has been started and/or may indicate the value of the timer. The CGW 1304 may send a message to the eNB 1302 to restart the timer (e.g., to restart the timer periodically). This may prevent the expiration of the timer. The CGW 1304 may send the timer reset when data is being sent to and/or from the WTRU, for example, over WiFi (e.g., which may mean that the S1 bearer associated with the CGW 1304 and a SGW is in use). A protocol may be used for this communication, for example, such as an S1 protocol and/or a protocol that may be defined for the interface. Since the timer may not expire, the radio bearer associated with (e.g., between) the WTRU and the eNB 1302 and/or the S1 bearer associated with (e.g., between) the CGW 1304 and a SGW may remain in place.

Figure 14:
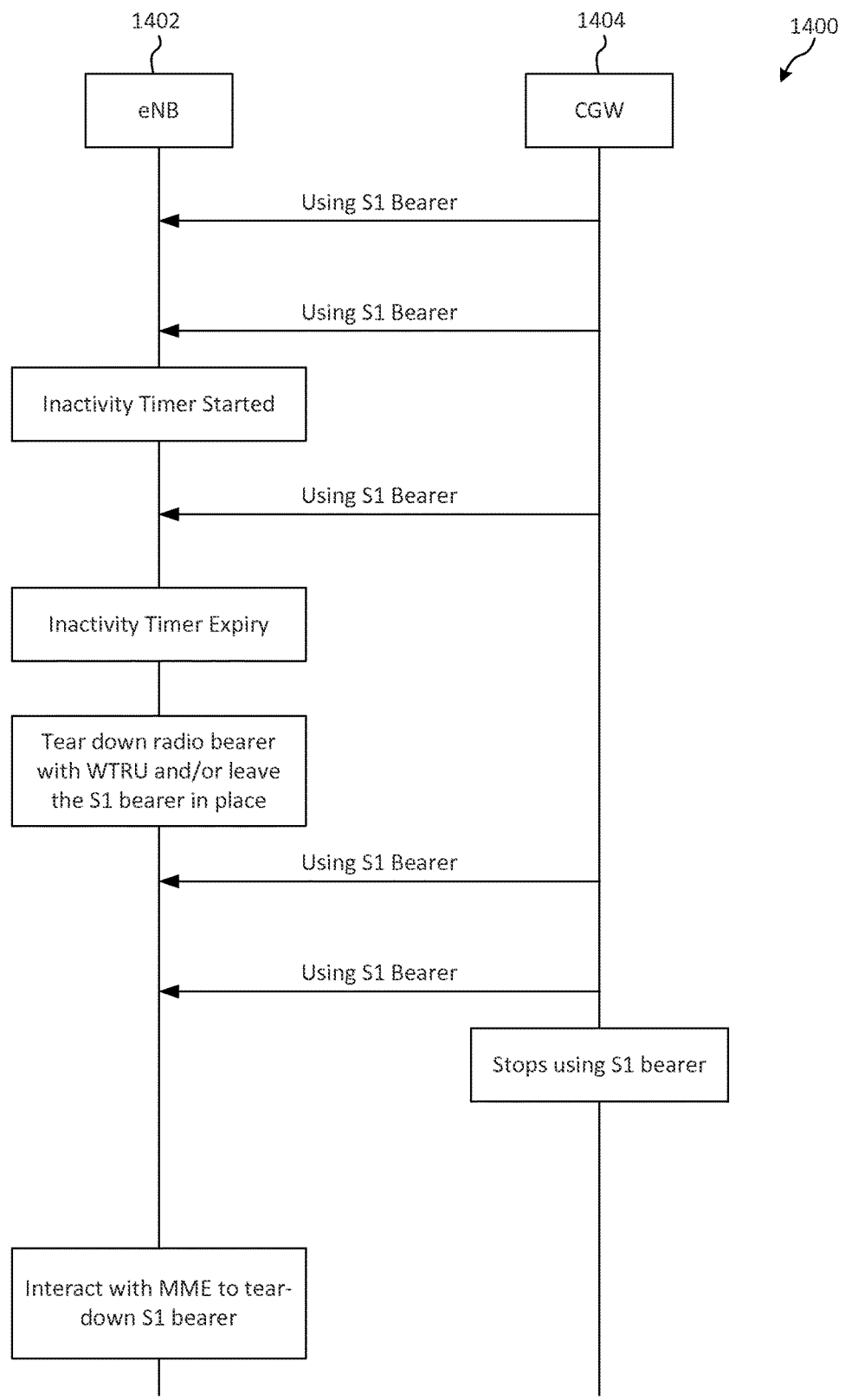
FIG. 14 depicts an example message sequence charts for Radio Bearer and/or S1 Bearer maintenance.

FIG. 14 depicts an example message sequence chart 1400 for radio bearer and/or S1 bearer maintenance. The message sequence chart of FIG. 14 may be applicable to an integrated CGW and/or a standalone CGW. An eNB may perform the message sequence of FIG. 14. A CGW 1404 may deliver data to and/or from a WTRU, for example, using WiFi (e.g., and using the S1 bearer associated with the CGW 1404 and a SGW). The CGW 1404 may send (e.g., periodically send) a signal to an eNB 1402 that it is using the S1 bearer associated with (e.g., between) the CGW 1404 and a SGW.

The eNB 1402 may start an inactivity timer. The inactivity timer may expire. Once the inactivity timer expires, the eNB 1402 may determine that it is still receiving a signal(s) from the CGW 1404 that the S1 bearer is in use. The eNB 1402 may remove the radio bearer associated with (e.g., between) the eNB 1402 and the WTRU. The eNB 1402 may leave the S1 bearer associated with (e.g., between) the CGW 1404 and a SGW in place. If the CGW 1404 stops using the S1 bearer, the CGW 1404 may stop sending the signal indicating that it is using the S1 bearer associated with (e.g., between) the CGW 1404 and a SGW. After some absence in time of the receipt of that signal from the CGW 1404, the eNB 1402 may interact (e.g., send/receive signals) with a MME to tear-down the S1 bearer associated with (e.g., between) the CGW 1404 and the SGW.

Although features and elements are described above in particular combinations, one of ordinary skill in the art will appreciate that each feature or element may be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, WTRU, terminal, base station, RNC, or any host computer. Features and/or elements described herein in accordance with one or more example embodiments may be used in combination with features and/or elements described herein in accordance with one or more other example embodiments. For example, a combination of elements of one or more of the above-described implementations may be implemented to manage expiry of the inactivity timer within an eNB.

What is claimed:

1. A method comprising:
   intercepting, by a Gateway (GW), a first message from an Evolved Node (eNB) intended for a mobility management entity (MME), wherein the first message comprises an indication to initiate removal of a first bearer and a second bearer;
   determining, by the GW, to maintain the second bearer to maintain a communication path associated with the GW and a wireless transmit/receive unit (WTRU); and
   sending, by the GW, a second message to the eNB to remove the first bearer.

2. The method of claim 1, further comprising:
   withholding the indication from the MME.

3. The method of claim 1, wherein the first message comprises a WTRU Context Release Request, and wherein the second message comprises a WTRU Context Release Command.

4. The method of claim 1, further comprising:
   receiving a response from the eNB confirming the removal of the first bearer, wherein the response comprises a WTRU Context Release Complete message.

5. The method of claim 1, further comprising:
   determining to send communications towards the WTRU via the first bearer; and
   sending a third message to the eNB to reestablish the first bearer, wherein the third message comprises an Evolved Universal Terrestrial Radio Access Network (EUTRAN) Radio access bearer (E-RAB) setup request.

6. The method of claim 5, wherein determining to send communications towards the WTRU via the first bearer comprises receiving a non-access stratum (NAS) Service Request message.

7. The method of claim 5, further comprising:
   sending a paging message to the eNB to reestablish a communication path associated with the WTRU and the eNB; and
   receiving a non-access stratum (NAS) Service Request message.

8. The method of claim 1, wherein the first bearer comprises an S1 bearer associated with the eNB and the GW or a Radio Bearer associated with the eNB and the WTRU.

9. The method of claim 1, wherein the second bearer comprises an S1 bearer associated with the GW and a serving gateway (SGW).

10. The method of claim 1, wherein the gateway is a converged gateway (CGW) or a local gateway (LGW), and wherein the gateway is a standalone device or the eNB comprises the gateway.

11. A gateway (GW) comprising:
    a processor configured to:
    intercept a first message from an Evolved Node B (eNB) intended for a mobility management entity (MME), wherein the first message comprises an indication to initiate removal of a first bearer and a second bearer;
    determine to maintain the second bearer to maintain a communication path associated with the GW and a wireless transmit/receive unit (WTRU); and
    send a second message to the eNB to remove the first bearer.

12. The GW of claim 11, wherein the processor is further configured to:
    withhold the indication from the MME.

13. The GW of claim 11, wherein the first message comprises a WTRU Context Release Request, and wherein the second message comprises a WTRU Context Release Command.

14. The GW of claim 11, wherein the processor is further configured to:
    receive a response from the eNB confirming the removal of the first bearer, wherein the response comprises a WTRU Context Release Complete message.

15. The GW of claim 11, wherein the processor is further configured to:
    determine to send communications towards the WTRU via the first bearer; and
    send a third message to the eNB to reestablish the first bearer, wherein the third message comprises an Evolved Universal Terrestrial Radio Access Network (EUTRAN) Radio access bearer (E-RAB) setup request.

16. The GW of claim 15, wherein determine to send communications towards the WTRU via the first bearer comprises receive a non-access stratum (NAS) Service Request message.

17. The GW of claim 15, wherein the processor is further configured to:
    send a paging message to the eNB to reestablish a communication path associated with the WTRU and the eNB; and receive a non-access stratum (NAS) Service Request message.

18. The GW of claim 11, wherein the first bearer comprises an S1 bearer associated with the eNB and the GW or a Radio Bearer associated with the eNB and the WTRU.

19. The GW of claim 11, wherein the second bearer comprises an S1 bearer associated with the GW and a serving gateway (SGW).

20. The GW of claim 11, wherein the gateway is a converged gateway (CGW) or a local gateway (LGW), and wherein the gateway is a standalone device or the eNB comprises the gateway.

* * * * *